(12) United States Patent
Simon et al.

(10) Patent No.: US 6,994,518 B2
(45) Date of Patent: Feb. 7, 2006

(54) PRE-WHIRL GENERATOR FOR RADIAL COMPRESSOR

(75) Inventors: Volker Simon, Landau (DE); Mathias Weber, Kaiserslautern (DE); Christian Holzschuh, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/712,125

(22) Filed: Nov. 13, 2003

(65) Prior Publication Data

US 2004/0096316 A1    May 20, 2004

(30) Foreign Application Priority Data

Nov. 13, 2002  (EP)  .................................. 02025323
Feb. 5, 2003   (EP)  .................................. 03002520

(51) Int. Cl.
    *F01D 17/01*    (2006.01)
(52) U.S. Cl. ...................... 415/147; 415/156; 415/159; 415/185
(58) Field of Classification Search ................ 415/147, 415/156, 160, 159, 185, 191, 209.3
    See application file for complete search history.

(56) References Cited

U.S. PATENT DOCUMENTS

| | | | | |
|---|---|---|---|---|
| 2,337,861 A | * | 12/1943 | Adamtchik | ................. 415/159 |
| 2,373,166 A | * | 4/1945 | Chapman et al. | ........... 415/157 |
| 2,614,747 A | * | 10/1952 | Christensen | ................. 415/156 |
| 3,237,918 A | * | 3/1966 | Le Bell et al. | .......... 415/210.1 |
| 3,397,836 A | * | 8/1968 | Badger et al. | .............. 415/156 |
| 3,406,760 A | * | 10/1968 | Weir | .......................... 416/240 |
| 3,664,759 A | * | 5/1972 | Biheller | ...................... 415/147 |
| 3,723,021 A | * | 3/1973 | Bartholomew | .............. 415/147 |
| 4,029,433 A | * | 6/1977 | Penny et al. | ................ 415/147 |
| 4,764,088 A | * | 8/1988 | Kapich | ........................ 415/150 |
| 4,874,288 A | * | 10/1989 | Kapich | ........................ 415/150 |
| 5,472,314 A | * | 12/1995 | Delonge et al. | ............ 415/156 |

FOREIGN PATENT DOCUMENTS

JP          06101410 A   *   4/1994

* cited by examiner

*Primary Examiner*—Edward K. Look
*Assistant Examiner*—Igor Kershteyn
(74) *Attorney, Agent, or Firm*—Pendorf & Cutliff; Greg Dziegielewski

(57) ABSTRACT

A pre-whirl generating apparatus (26) is provided that employs deformable air deflecting vanes (46) adjacent the inlet (18) of a radial air compressor (12-22), which vanes (46) can be mechanically deformed to generate positive, neutral, or negative pre-whirl flow to the compressor. A minimum number of parts are used to position one or more thin, deformable vanes (46) in the intake channel (34) leading to the compressor inlet (18). In their undeformed position, the vanes (46) do not deflect the incoming air, thereby causing little or no flow restriction. To achieve the desired positive or negative pre-whirl of flow to the compressor (12-22), the trailing edge (62) of the vanes (46) are deflected transverse to the direction of flow in the channel (34) in either the positive or negative direction.

47 Claims, 22 Drawing Sheets

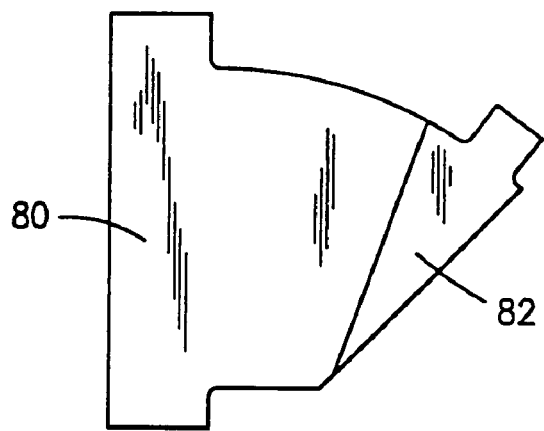
*Fig. 4*
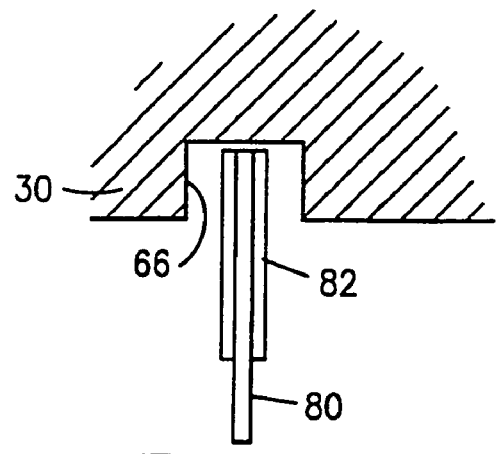
*Fig. 5*
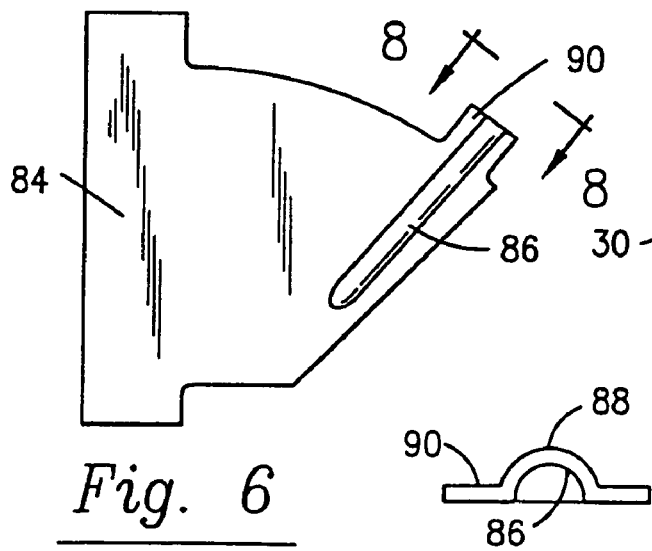
*Fig. 6*
*Fig. 8*
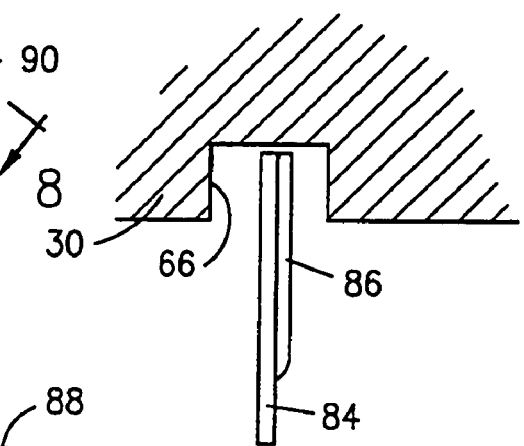
*Fig. 7*

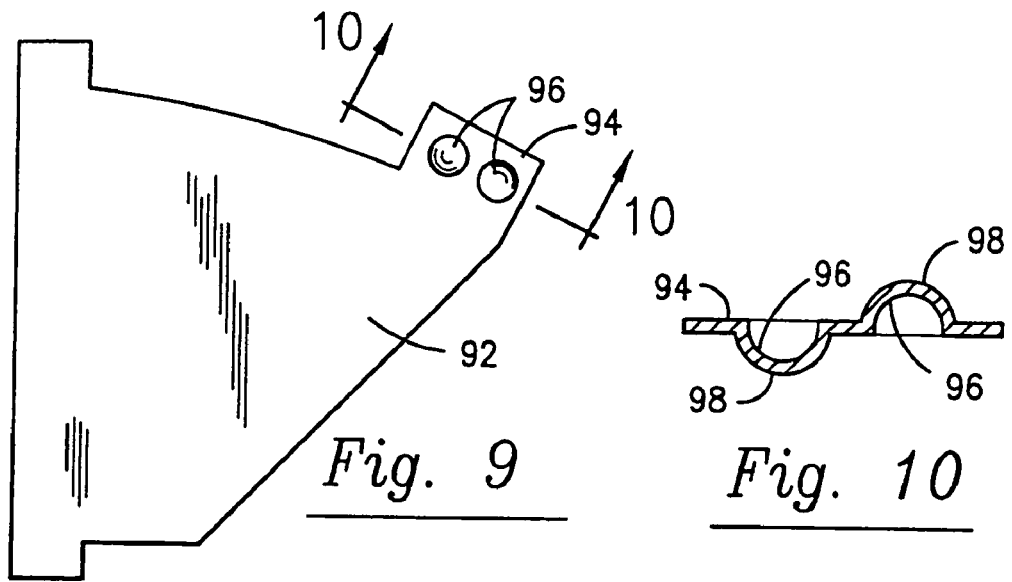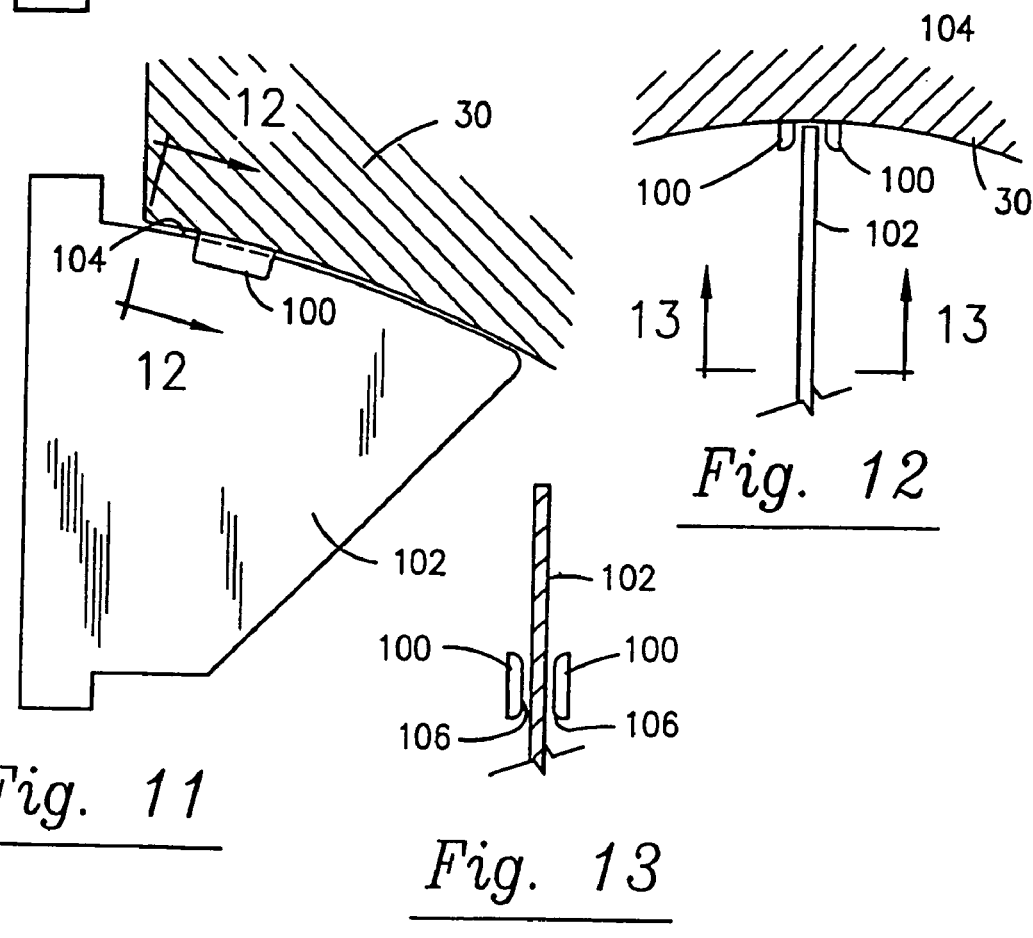

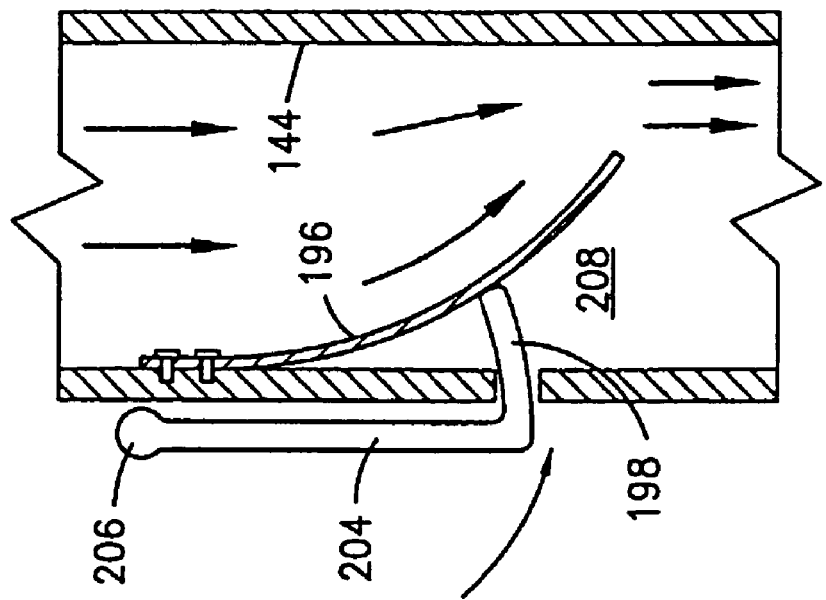
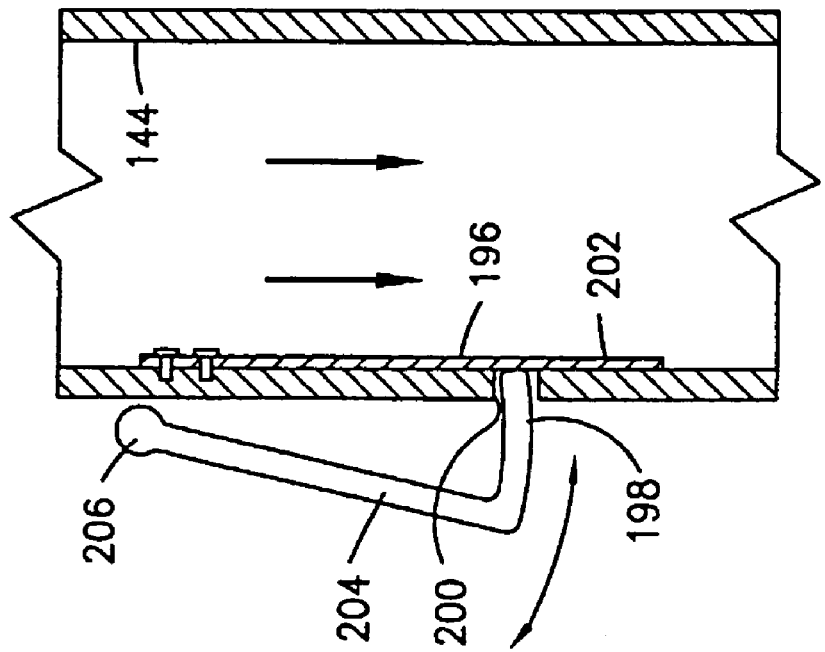

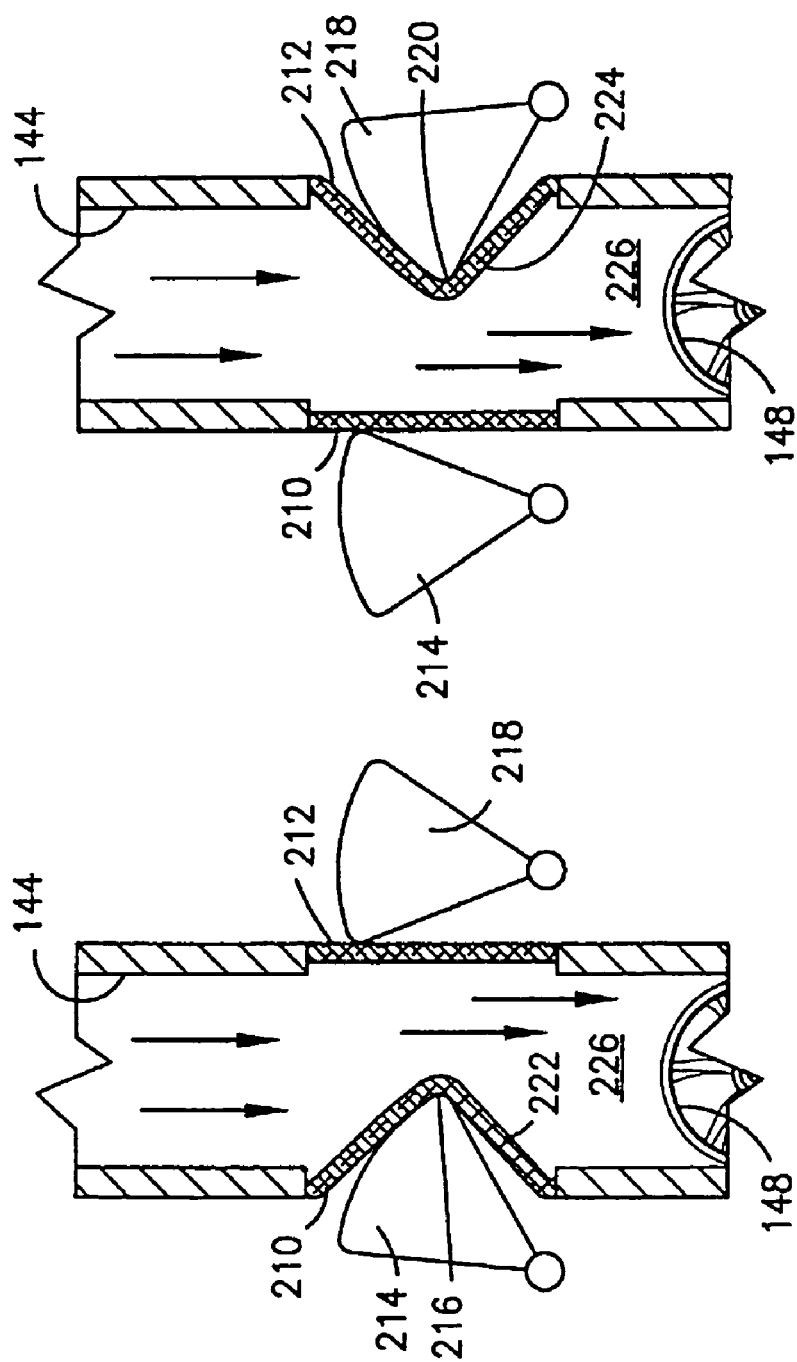

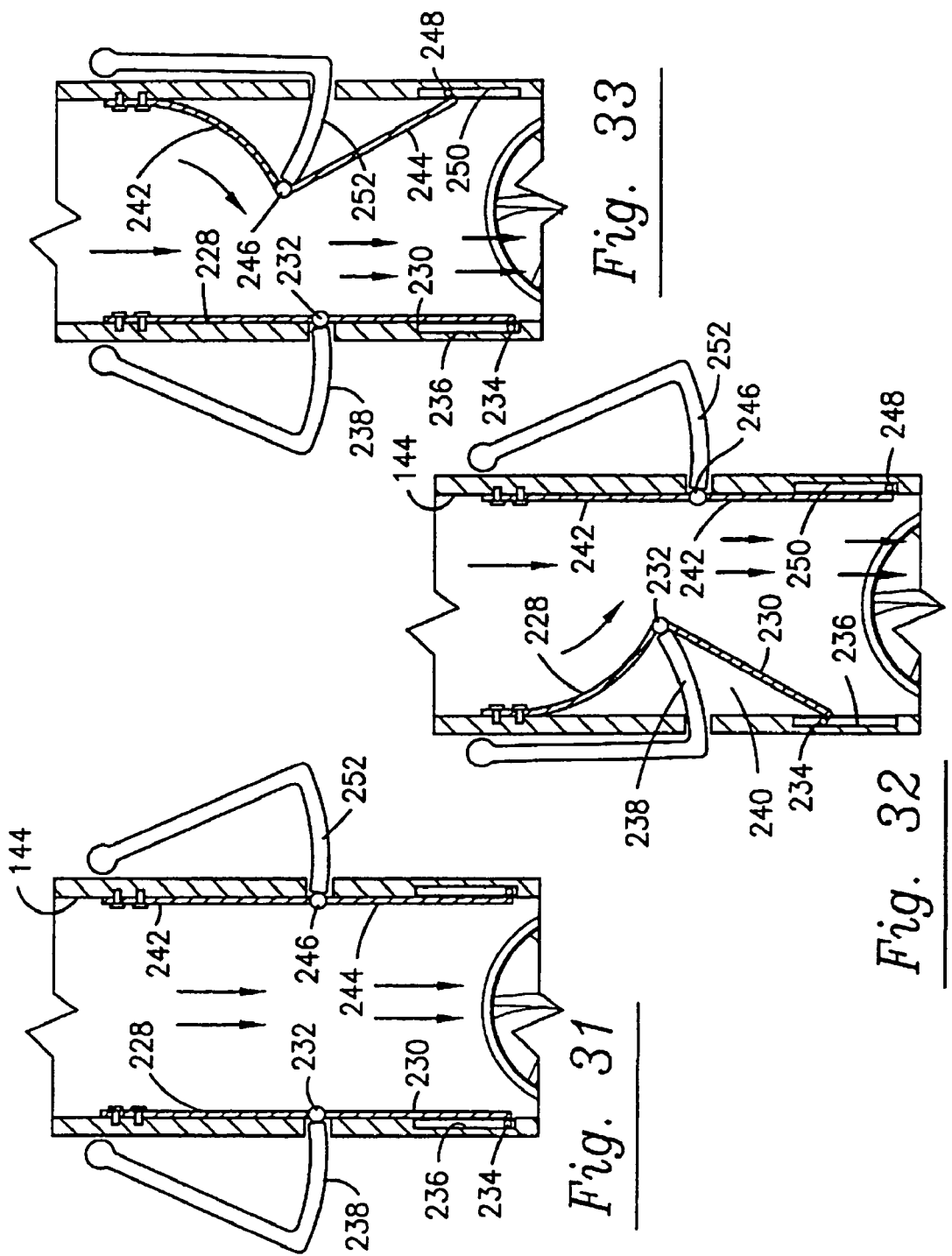

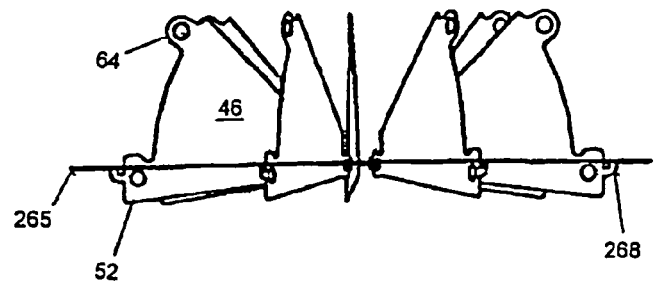
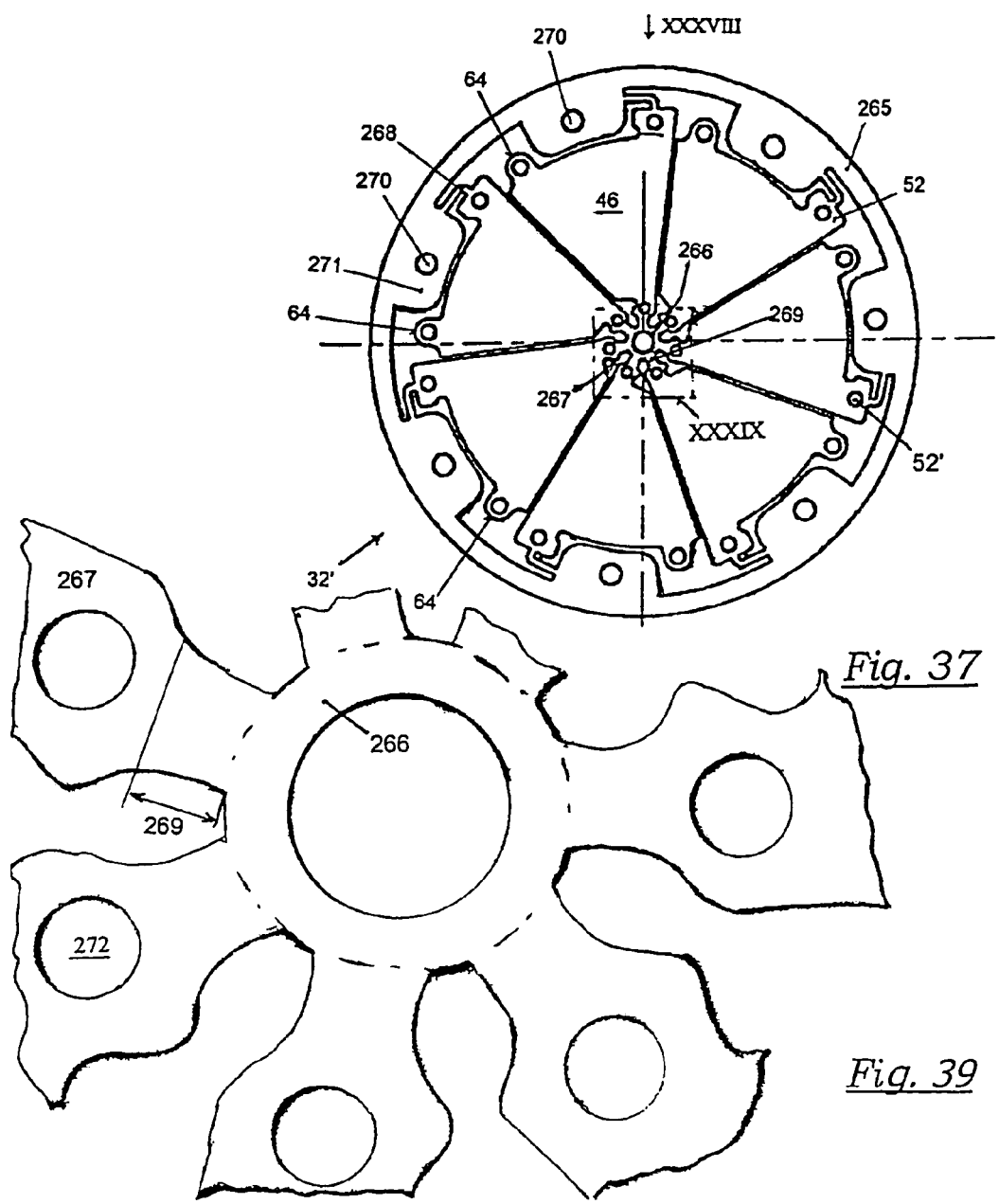

PRE-WHIRL GENERATOR FOR RADIAL COMPRESSOR

FIELD OF THE INVENTION

The present invention relates to turbochargers for internal combustion engines and more particularly to an arrangement for pre-whirling supply air as it enters the inlet of a radial compressor, which compressor forms a part of the turbocharger.

BACKGROUND OF THE INVENTION

Turbochargers are widely used on internal combustion engines, and in the past have been particularly used with large diesel engines, especially for highway trucks and marine applications. In distinction to superchargers, which derive their power directly from the crankshaft of the engine, turbochargers are driven by the engine exhaust gases. Exhaust gases are directed to and drive a turbine, and the turbine shaft is connected to and drives the compressor. Ambient air is compressed by the compressor and fed into the intake manifold of the engine.

More recently, in addition to use in connection with large diesel engines, turbochargers have become popular for use in connection with smaller, passenger car power plants. The use of a turbocharger in passenger car applications permits selection of a power plant that develops the same amount of horsepower from a smaller, lower mass engine. Using a lower mass engine has the desired effect of decreasing the overall weight of the car, increasing sporty performance, and enhancing fuel economy. Moreover, use of a turbocharger permits more complete combustion of the fuel delivered to the engine, thereby reducing the hydrocarbon emissions of the engine, which contributes to the highly desirable goal of a cleaner environment.

Fixed geometry turbochargers are normally designed to operate at peak efficiency at a particular engine speed and load. Smaller passenger car engines are normally operated over a wide range of engine speeds and load. When a turbocharger is operated over a wide range of engine speed and load, the turbocharger components function outside the optimum design range and consequently suffer loss of efficiency that adversely affects engine performance. In operation of a turbocharger employing a radial compressor, it is known that pre-whirling the supply air to the compressor can have beneficial effects in both broadening the efficient operating range of the compressor and increasing its efficiency. Both positive and negative pre-whirl can be used to achieve these desired effects.

An early attempt at choking the flow of air entering a compressor is shown in U.S. Pat. No. 3,723,021 to Bartholomew. That patent shows a flow choking arrangement for the intake of an axial flow primary compressor such as are used in connection with an axial flow gas turbine engine. A flexible vane is fixed at its leading edge and is deflected sideways along the circumference of a cylindrical intake channel. The radially outer corner of the trailing edge of the vane is fixed to a rotating disk that is in turn pinned into a cylindrical ring in the outer wall of the channel. The rotating disk twists the vane, and the pin rotates within the ring, as the ring moves circumferentially. The rotating disk rotates to accommodate the reduced axial length of the vane in its deflected position. The radially outer edge of the vane is cut away to prevent interference with the wall of the cylindrical channel when the vane is deflected. This complicated arrangement permits limited deflection of the trailing edge of the vane, is prone to jamming and involves excessive friction to operate, and the offset attachment of the vane to the rotating pin permits deflection of the vane in only one direction. This system is very complicated, has many moving parts, and very limited utility. It appears to be a complex, expensive structure intended for use on a large expensive turbine engine in which pre-whirl in both positive and negative directions is not considered.

The benefits of pre-whirling supply air to a radial compressor in both a positive and negative direction were discussed more fully in a paper published in the *Proceedings of the Institute of Mechanical Engineers*, Vol. 189 43/75 (March, 1975), titled "Experimental and Theoretical Performance of a Radial Flow Turbocharger Compressor with Inlet Pre-whirl," by Wallace, Whitfield and Atkey. In that paper, Wallace, et al. suggested that positive pre-whirl, that is, generating a pre-whirl of the intake air having a tangential component of velocity in the same direction as the impellor rotation, can broaden the operating range of a turbocharger by moving the surge line of the compressor map to a lower mass flow rate. The surge line of a compressor map defines the lowest flow rate at which a compressor can operate in a stable condition. At flow rates below the surge line, a compressor will vibrate violently and cease useful operation. Moving the surge line of a compressor to a lower mass flow rate permits stable operation at lower flow rates and engine speeds. This allows efficient and stable operation of a turbocharger at, for example, engine "lugging" speed. Wallace et al. also suggests that higher compressor efficiency can be achieved by imposing a negative pre-whirl at high operating speeds.

U.S. Pat. No. 3,922,108 to Benisek discloses an apparatus that generates positive pre-whirl by providing fixed vanes adjacent the compressor inlet. The Benisek device varies the volume of supply air that passes over those vanes by throttling a central unvaned passage with a butterfly valve, thereby varying the amount of pre-whirl supplied to the compressor.

In U.S. Pat. No. 4,780,055 to Zloch et al., a plurality of circular sections are pivotally arranged in the compressor intake channel to restrict flow therein. The sections are not intended to generate pre-whirl. In fact, Zloch et al. states that the flow channel is narrowed after the restrictor sections to generate an accelerated jet flow that suppresses wake disturbances from the circular restrictor sections to provide a uniform inlet flow to the compressor rotor disk.

Other patents showing a choking vane structure for modifying the inflow of gas to a radial compressor in a refrigeration device are U.S. Pat. No. 3,667,860 to Endress et al. and U.S. Pat. No. 6,039,534 to Stoner et al. Stoner shows two sets of fixed vanes, the first of which deflects the gaseous refrigerant flow a little, and the second deflects it more. In addition, U.S. Pat. No. 5,096,374 to Sakai et al. shows a choking mechanism for a turbo-compressor having a very complicated external circumferential ring linked to actuating shafts extending into the intake channel. None of these references mentions whether it is intended to generate, or is capable of generating, positive and/or negative pre-whirl to the compressor inlet.

Lastly, U.S. Pat. No. 5,560,208 to Halimi et al. refers to the Wallace et al. paper cited above and suggests that means should be provided on the compressor intake to switch from positive to negative pre-whirl, but no structure to accomplish this desired end is disclosed or suggested.

SUMMARY OF THE INVENTION

It is therefore a primary object of the present invention to provide a simple and effective means of enhancing the performance of a turbocharger by selectively generating either positive or negative pre-whirl of supply air to a radial compressor of the turbocharger as required by varying engine operating modes.

Another object of the invention is to provide a turbocharger performance enhancing apparatus that is lightweight, easy to manufacture and durable in operation.

In accordance with the present invention, these and other objects are achieved by providing deformable air deflecting vanes adjacent the inlet of a radial air compressor, which vanes can be mechanically deformed to generate positive or negative pre-whirl flow to the compressor, or to create an absence of any pre-whirl flow to the compressor. In a first embodiment of the invention, a minimum number of parts are used to position one or more thin deformable vanes in the intake channel leading to the inlet of a radial compressor. The thin vanes in their undeflected position do not deflect the incoming air, thereby causing little or no flow restriction. In order to achieve the desired positive or negative pre-whirl flow of air to the compressor, the leading edge of the vane or vanes is fixed to the flow channel housing, and the trailing edge is deflected transverse to the direction of flow in the channel in either the positive or negative direction. This can be accomplished by a tab projecting from the radially outer corner of the trailing edge of the vane, which tab is received in a slot in an annular ring, the inner wall of which forms a portion of the flow channel. Alternatively, a pair of tabs can be formed on the ring receiving the trailing edge of the vane between the tabs. With either arrangement, when the ring is rotated slightly in either direction, the vane or vanes are deflected to cause either positive or negative pre-whirl flow into the compressor. Preferably, the ring is positioned in a frusto-spherical portion of the intake channel where the diameter of the channel is decreased to present a high velocity flow of air to the compressor. This geometry of the intake channel allows the vanes to have a shape that adheres to the wall of the channel throughout their wide range of deflection. With this arrangement, the objects of the invention are achieved by a mechanism having only four basic parts: a pre-whirl generator housing, an annular rotating ring, a pinion gear to control rotation of the ring, and a central vane carrier positioned in the intake channel of the compressor.

In an alternative form of the above embodiment, the vane carrier and housing are arranged to telescope toward and away from one another axially. The vane carrier can be moved toward and away from the housing by a rack gear formed on the outer shell of the vane carrier cooperating with a pinion gear mounted on the pre-whirl generator housing. Alternatively, the vane carrier can be fixed with respect to the housing, and a sleeve within the housing can be moved toward and away from the vane carrier by similar means. With the former arrangement, the pre-whirl generator of the present invention can be formed of only three basic parts: a housing, and a vane carrier driven by a pinion gear.

The leading edges of the vanes are fixed to the outer shell of the vane carrier, and the trailing edges of the vanes are received in grooves formed in the housing. The grooves are formed at an angle to the axis of the intake channel and thus assume a helical shape in the housing. By moving the vane carrier axially away from the housing, the vanes are deflected to form a pre-whirl flow in a first pre-whirl direction, for example, a negative direction. By moving the vane carrier toward the housing, the deflection of the vanes in the first pre-whirl direction is reduced until, at an intermediate point in its full telescopic stroke, the vanes assume a neutral position, and no pre-whirl is generated. By moving the vane carrier still further toward the housing, the vanes are deflected in the opposite direction to generate a pre-whirl flow in a second, opposite direction, for example, a positive direction.

The preferred form of this embodiment of the invention is the one in which the vane carrier is moved toward and away from the housing. This is because it permits the vane carrier (and the vanes) to be placed nearest the intake of the compressor when the greatest deflection of the incoming air is needed. That is, the geometry of the grooves in the housing can be arranged to create a relatively weak negative pre-whirl when the vane carrier is moved away from the housing and a very strong positive pre-whirl when the vanes are moved toward the housing. In this way, a negative pre-whirl is generated with very little obstruction of the intake passage during high flow rate operating conditions when only a weak negative pre-whirl is required, and a very strong positive pre-whirl can be generated, with the vanes close to the compressor intake, when a strong pre-whirl is desired during low flow rate conditions.

In another alternative embodiment of the invention, where the intake channel is generally perpendicular to the axis of the compressor, a pair of deformable vanes can be provided along the interior wall of the intake channel to a radial compressor. In their undeflected position, the vanes allow undisturbed flow to the compressor inlet. By mechanically deflecting the trailing edge of a first vane into the intake flow channel, pre-whirl flow can be generated in a first pre-whirl direction. By releasing the deflection of the first vane allowing it to return to its undeflected position, and mechanically deflecting the trailing edge of a second vane into the intake flow channel, pre-whirl flow can be imparted to the air entering the compressor in a second pre-whirl direction. With this arrangement, any desired pre-whirl, positive or negative, can be generated by selectively actuating one or the other of the two vanes. In a specialized circumstance where it is desired to generate pre-whirl in only one direction, a single vane can be employed.

Turbochargers of the type with which the pre-whirl generating assembly of the present invention are typically associated are normally employed in an automotive environment. In this environment, it is a common problem that space in the engine compartment is limited. It is also typical in this environment that all air supplied to a turbocharger compressor must first pass through an air filter to remove any particulate matter that might damage the turbocharger and/or the engine with which it is associated. Due to space limitations, it is frequently possible that these components cannot be located together in the engine compartment, and as a result, the air filter may need to be located in a remote position from the turbocharger compressor inlet. In this common situation, the tubing or conduit from the air filter to the compressor may be circuitous, and as such, may set up an inadvertent and unwanted pre-whirl motion to the air in the passage in an unknown direction. In order to compensate for this problem, it is preferred to include a central stabilizing divider wall in the intake channel upstream of the pre-whirl generator. The purpose of this divider wall is to negate any inadvertent or undesired pre-whirl that may have been generated by the shape of or turns in the air conduit leading to the compressor so that the pre-whirl actually supplied to the compressor is more reliable and effective.

In yet another alternative embodiment of the invention, the generally perpendicular intake channel leading to the compressor inlet is arranged eccentrically to the compressor inlet, and a single deformable vane is provided along the wall of the intake channel furthest from the center of the compressor wheel. With the vane in its undeflected position, the supply air will form a vortex, or pre-whirl, in a predetermined direction, for example, a negative pre-whirl. When the vane is partially deflected, the vortex pre-whirl will be substantially suppressed, eliminating any pre-whirl to the compressor. As the vane is deflected further, it will generate a pre-whirl motion to the incoming air in a direction opposite to the previous undeflected vortex, or in this example, a positive pre-whirl. As mentioned above, this arrangement can be constructed so that the natural vortex, which is relatively weak, can be a negative pre-whirl so that a weak negative pre-whirl is associated with an open channel permitting maximum flow, and maximum positive pre-whirl is generated by a fully deflected vane at relatively low flow rates.

In all of the above embodiments, the apparatus employed to practice this invention is relatively easy to manufacture and has few moving parts. Accordingly, the present invention provides a performance-enhancing device that is lightweight, adding little to the overall mass of a vehicle engine, and is durable in operation.

These and other aspects of the invention will be more apparent from the following description of the preferred embodiments thereof when considered in connection with the accompanying drawings.

BRIEF DESCRIPTION OF THE DRAWINGS

The present invention is illustrated by way of example and not limitation in the accompanying drawings in which like references indicate similar parts, and in which:

FIG. 4 is an elevational view of an alternative vane for use in connection with the present invention;

FIG. 5 is a left side elevational view, taken partly in section, of the alternative vane of FIG. 4 shown in its relation to a slot in an annular actuating ring;

FIG. 6 is an elevational view of yet another alternative vane for use in connection with the present invention;

FIG. 7 is a left side elevational view, taken partly in section, of the alternative vane of FIG. 6 shown in its relation to a slot in an annular actuating ring;

FIG. 8 is a view taken along line 8—8 of FIG. 6 illustrating a feature of the vane of FIG. 6;

FIG. 9 is an elevational view of yet another alternative vane for use in connection with the present invention;

FIG. 10 is a sectional view taken along line 10—10 of FIG. 9 illustrating a feature of the vane of FIG. 9;

FIG. 11 is an elevational view of yet another alternative vane for use in connection with the present invention;

FIG. 12 is a view, taken along line 12—12 of FIG. 11, of the alternative vane of FIG. 11 shown in its relation to a fork extending from an annular actuating ring;

FIG. 13 is a view taken along line 13—13 of FIG. 12 illustrating a feature of the vane and actuating means of FIGS. 11 and 12;

FIG. 27 is a fragmentary sectional view of the intake channel of the pre-whirl generator of FIGS. 21 and 25, showing an alternative deflecting vane and actuator, with the vane in an undeflected position;

FIG. 28 is a fragmentary sectional view as in FIG. 27, but showing the deflecting vane in a deflected position;

FIG. 29 is a fragmentary sectional view of the intake channel as in FIG. 27, showing a pair of alternative deflecting vanes and actuators, with a first vane in a deflected position, and a second vane in an undeflected position;

FIG. 30 is a fragmentary sectional view as in FIG. 29, but showing the first vane in an undeflected position, and the second vane in a deflected position;

FIG. 31 is a fragmentary sectional view of the intake channel as in FIG. 27, showing another pair of alternative deflecting vanes and actuators, with both vanes in an undeflected position;

FIG. 32 is a fragmentary sectional view as in FIG. 31, but showing the first vane in a deflected position, and the second vane in an undeflected position;

FIG. 33 is a fragmentary sectional view as in FIG. 31, but showing the first vane in an undeflected position, and the second vane in a deflected position;

FIG. 37 shows the vanes integrally formed with a surrounding inner and outer fixing ring after manufacture by laser-cutting and/or punching.

FIG. 38 is a plan view in the sense of arrow XXXVIII of FIG. 37 after bending the vanes approximately 90° out of the plane of FIG. 37; and FIG. 39 illustrates the detail XXXIX of FIG. 37 at a larger scale.

DETAILED DESCRIPTION OF THE PREFERRED EMBODIMENT

Figure 1:
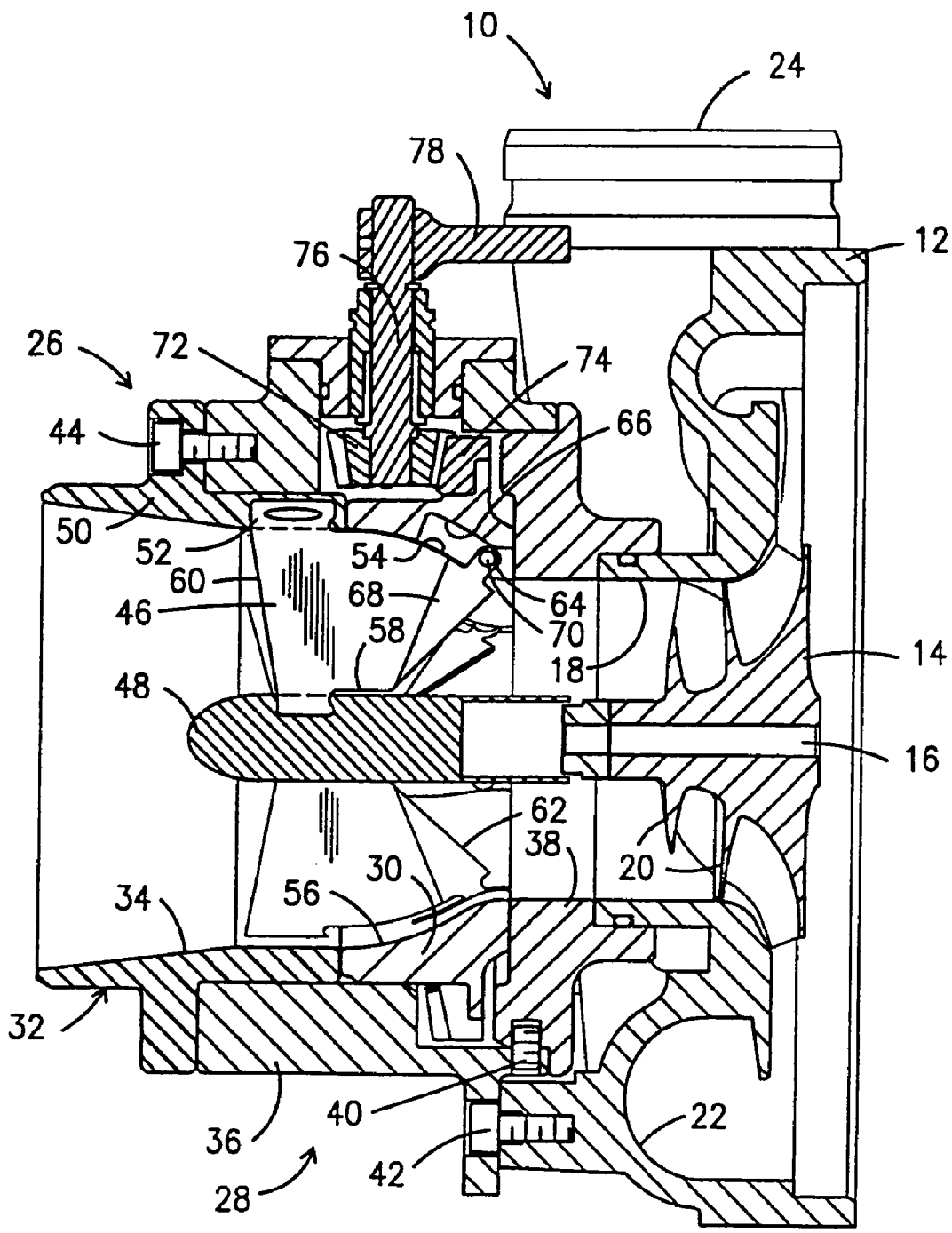
FIG. 1 is a front elevational view, taken in section, of the pre-whirl generator of the present invention, shown in connection with a radial compressor of a turbocharger.

A turbocharger compressor assembly is generally shown at 10 in FIG. 1 and is comprised of a compressor body 12 which houses a compressor wheel 14 rotatably mounted within the compressor body on a central rotating shaft 16. In a turbocharger, the shaft 16 is normally driven by a turbine (not shown) that is powered by exhaust gases from an internal combustion engine (also not shown) in a conventional and well known manner. The engine is the recipient of compressed air from the compressor assembly 10.

The compressor 10 is illustrated as a radial centrifugal compressor receiving air at an inlet 18 and driving that air radially over impellers 20 formed on the compressor wheel 14 into a circumferential outlet channel 22 formed in the compressor body 12, which channel leads to the compressor outlet 24. The outlet 24 is in direct communication with the air intake of the internal combustion engine with which the turbocharger compressor assembly 10 is associated.

For the purpose of generating pre-whirl of supply air to the compressor inlet 18, a pre-whirl generating assembly is provided and indicated generally at 26 in FIG. 1. The pre-whirl generating assembly 26 is affixed to the compressor body 12 adjacent the compressor inlet 18, and is comprised of a pre-whirl assembly housing, indicated generally at 28, an annular rotatable ring 30, and a vane carrier assembly 32. The interior surface of the pre-whirl housing 28, the ring 30, and the vane carrier 32 combine to form an intake channel 34 for conducting air to the compressor inlet 18. In the embodiment of the invention shown in FIG. 1, the pre-whirl assembly housing 28 is itself comprised of two separate pieces; an outer housing section 36, and an inner section 38 that is connected to the compressor body 12 at the compressor inlet 18. These pieces are connected together by conventional means. For example, the outer housing section 36 is affixed to the inner section 38 by a series of threaded fasteners 40, and the outer housing section 36 is also connected to the compressor body 12 by a series of fasteners 42. Similarly, the vane carrier assembly 32 is secured to the outer housing section 36 by a series of fasteners 44. It is understood that because space under the hood of a motor vehicle is very limited, at least some of the pre-whirl housing 28 could be formed integrally with the compressor body 12 to conserve space, rather than the bolt-on housing shown in FIG. 1.

The vane carrier assembly 32 includes an array of pre-whirl generating vanes 46 that are arranged axially about a central axis cowling 48 mounted axially and centrally located in the pre-whirl generating assembly 26 and in alignment with the shaft 16 of the compressor wheel 14. The vanes 46 are thin in construction and in their natural undeflected position are also arranged axially in the intake channel 34 so as not to deflect or significantly resist flow of air into the compressor inlet 18. The cowling 48 serves to accelerate the air moving through the channel 34 and does not permit the air flow to impinge upon the end of the compressor wheel shaft 16, thereby permitting a uniform flow of air to the compressor inlet 18. Preferably, the vanes 46 are formed of thin sheet metal and are molded integrally into the central cowling 48 and the outer shell 50 of the vane carrier assembly 32. The vanes 46 include a tab 52 at the radially outer corner of the leading edge of each vane 46 that is molded into the outer shell 50 of the vane carrier assembly 32. In this way, the outer shell 50, the vanes 46, and the cowling 48 are formed into a unitary vane carrier assembly 32, for purposes of assembling the pre-whirl generating assembly 26.

The radially outer edge 54 of the vanes 46 are formed as a section of a circle to conform with the shape of, and be spaced very slightly from, the inner surface 56 of the annular rotating ring 30, which is frusto-spherical in shape. The frusto-spherical shape of the inner surface 56 serves to allow close adherence of the outer edge 54 of the vanes 46 to the intake channel 34 when they are deflected, as will be described in more detail hereinafter. Also, the frusto-spherical shape of the surface 56 serves to reduce the diameter of the channel 34 and therefore accelerate the flow of air into the compressor inlet 18. A substantial portion of the radially inner edge 58 of the vanes 46, nearest the trailing edge thereof, is spaced slightly from the central cowling 48 to permit deflection of the vanes 46.

The leading edge 60 of the vanes 46 is shown as being linearly swept forward from the central cowling 48 out to the inner wall of the intake channel 34. Similarly, the trailing edge 62 of the vanes 46 is shown as being linearly swept back from the cowling 48 to the inner surface 56 of the ring 30. It will be understood that any other geometry of the leading and trailing edges 60 and 62 of the vanes 46 could be employed. For example, the leading and trailing edges 60 and 62 could be straight and perpendicular to the axis of the cowling 48, or either edge could be perpendicular while the other is swept forward or back. In addition, either or both edges could be curved, either forward or back. While any combination of straight, swept, or curved shapes of the leading and trailing edges 60 and 62 could be used, the preferred embodiment is illustrated in FIG. 1.

In order to allow lateral deflection of the vanes 46 to produce deflection of the air flowing through the channel 34 and thereby create the desired positive or negative pre-whirl at the inlet 18, a tab 64 is formed extending from the outer edge 54 of the vanes 46 adjacent their trailing edge 62. The tab 64 is received in a generally axial slot 66 formed in the inner wall of the annular ring 30. If desired, the generally axial slot 66 can be curved so that it is not perfectly axial in order to achieve any desired form of the deflected vane 46. In order to create even deflection of the vanes 46 and to prevent binding of the tab 64 in the slot 66, the tab 64 and the trailing edge 62 of the vanes 46 are preferably reinforced by an increased thickness portion 68 along the trailing edge of the vanes 46, and the tab 64 includes two hemispherical bearings 70 arranged to contact the walls of the slots 66 and permit twisting of the tabs 64 within the slots 66. In addition, to position the annular ring 30 in the housing 28 and to permit rotation thereof with respect to the housing, the annular ring 30 has three bearing faces. At its leading edge, the ring 30 contacts the outer shell 50 of the vane carrier 32. At its outer periphery, the ring 30 contacts the outer housing section 36, and at its trailing edge, the ring 30 contacts the inner section 38 of the housing 28.

With this arrangement, the actual deflection of the vanes 46 to create either a positive or negative pre-whirl is accomplished by rotating the annular ring 30 in either a clockwise or counterclockwise direction (as viewed from the left in FIG. 1). Rotation of the ring 30 is accomplished by a beveled pinion gear 72 that cooperates with a beveled gear section 74 on the periphery of the ring 30. The pinion gear 72 is mounted on a shaft 76 that can be rotated by an arm 78. The arm 78 can be moved by any suitable means (not shown) in order to accomplish the desired rotation of the ring 30 in either the clockwise or counterclockwise direction. For example, the arm 78 can be attached to or be part of a mechanical linkage actuated by an electro-mechanical or pneumatic actuator, or a suitable actuating device, such as a servo-motor, could be attached directly to the shaft 76. This simple vane adjustment mechanism is much less complicated than systems shown in the prior art and can be actuated in either direction quickly and easily with a minimum of resistance or friction.

When the ring 30 is rotated to deflect the vanes 46, the tab 64 will follow the ring 30 by virtue of being trapped in the slot 66 and the vanes 46 will bend in the direction of rotation of the ring 30. While the vanes 46 are bending in the direction of rotation of the ring 30, the tab 64 will migrate along the slot 66 toward the leading edge of the vanes 46 (to the left in FIG. 1). With this arrangement, any desired amount of deflection of the vanes 46 can effected in either the positive or negative pre-whirl direction.

It should be noted that any number of vanes 46 could be used to accomplish the desired positive or negative pre-whirl of air to the compressor. A single vane 46 could be employed to achieve the desired effect, but that arrangement is not preferred in the embodiment of the invention illustrated in FIG. 1. Two or more vanes 46 are preferred, and in the embodiment illustrated in FIGS. 1–3, seven vanes 46 are shown.

It should also be noted that far fewer parts are required to construct the pre-whirl generating device of the present invention than in the more complicated and expensive structures shown in the prior art. In fact, this embodiment of the invention includes only four basic operative parts: the pre-whirl assembly housing 28, the annular rotatable ring 30, the beveled pinion gear 72, and the integral vane carrier assembly 32. Also, the stationary housing 28 of the present invention is bolted directly to the stationary compressor body 12 without any direct connection to the rotating parts of the compressor such as the compressor wheel 14. Accordingly, fewer parts need to be sealed with expensive seals designed to withstand a high-speed rotary interface. Because such seals wear out quickly, the pre-whirl generator of the present invention is not only relatively inexpensive to manufacture, but is far more reliable and durable in operation, is less expensive to maintain, and will experience far less gas leakage than prior art devices.

Figure 2:
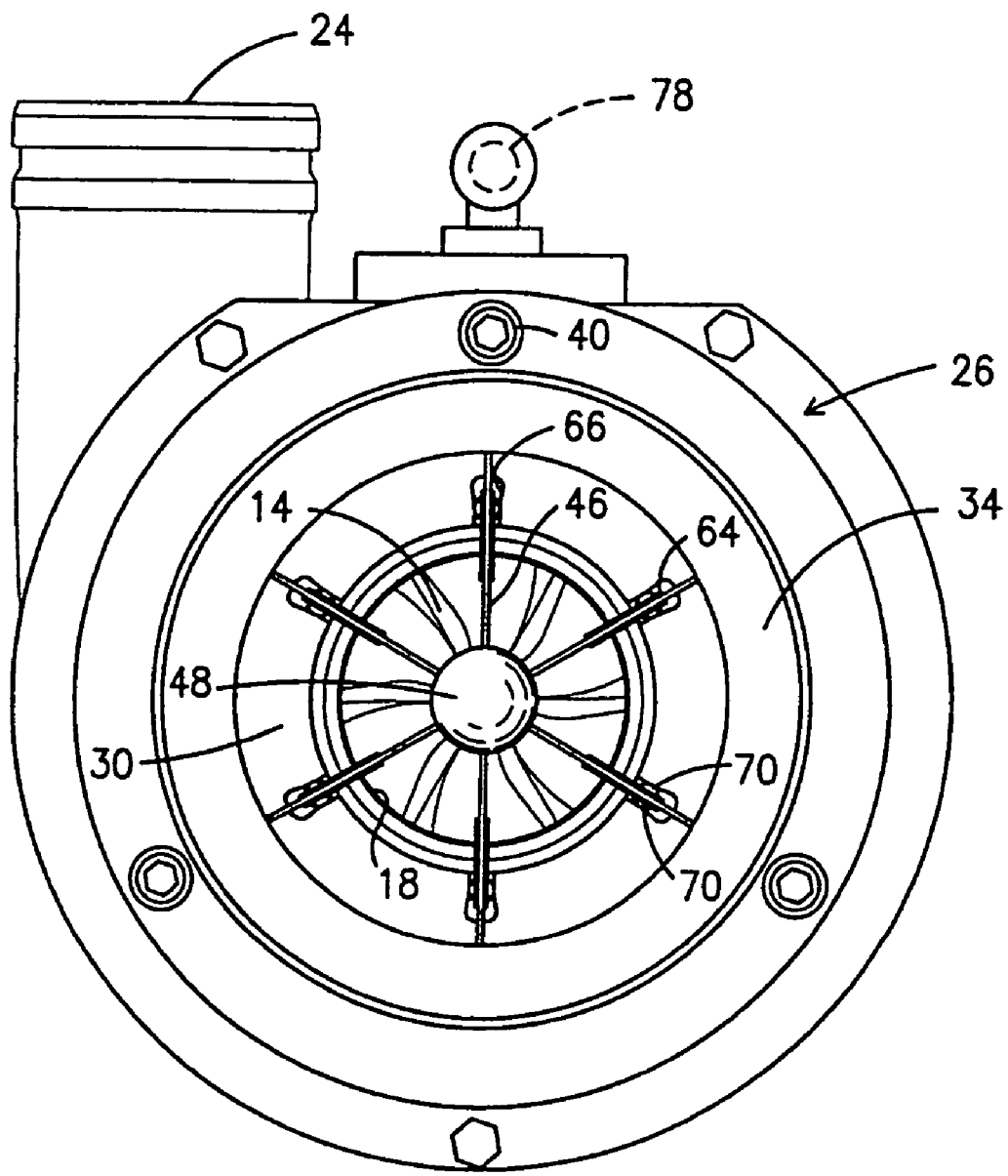
FIG. 2 is a left side elevational view of the pre-whirl generator of FIG. 1, showing the pre-whirl generating vanes in their undeflected position.

FIG. 2 is a view taken from the left side of the pre-whirl generating assembly 26 of FIG. 1 and shows the vanes 46 in their undeflected position. From this view it can be seen that the vanes 46 are very thin and offer little or no resistance to the flow of air to the inlet 18 of the compressor. Also, the tabs 64 and hemispherical bearings 70 can be seen received in the slots 66 in the annular ring 30.

Figure 3:
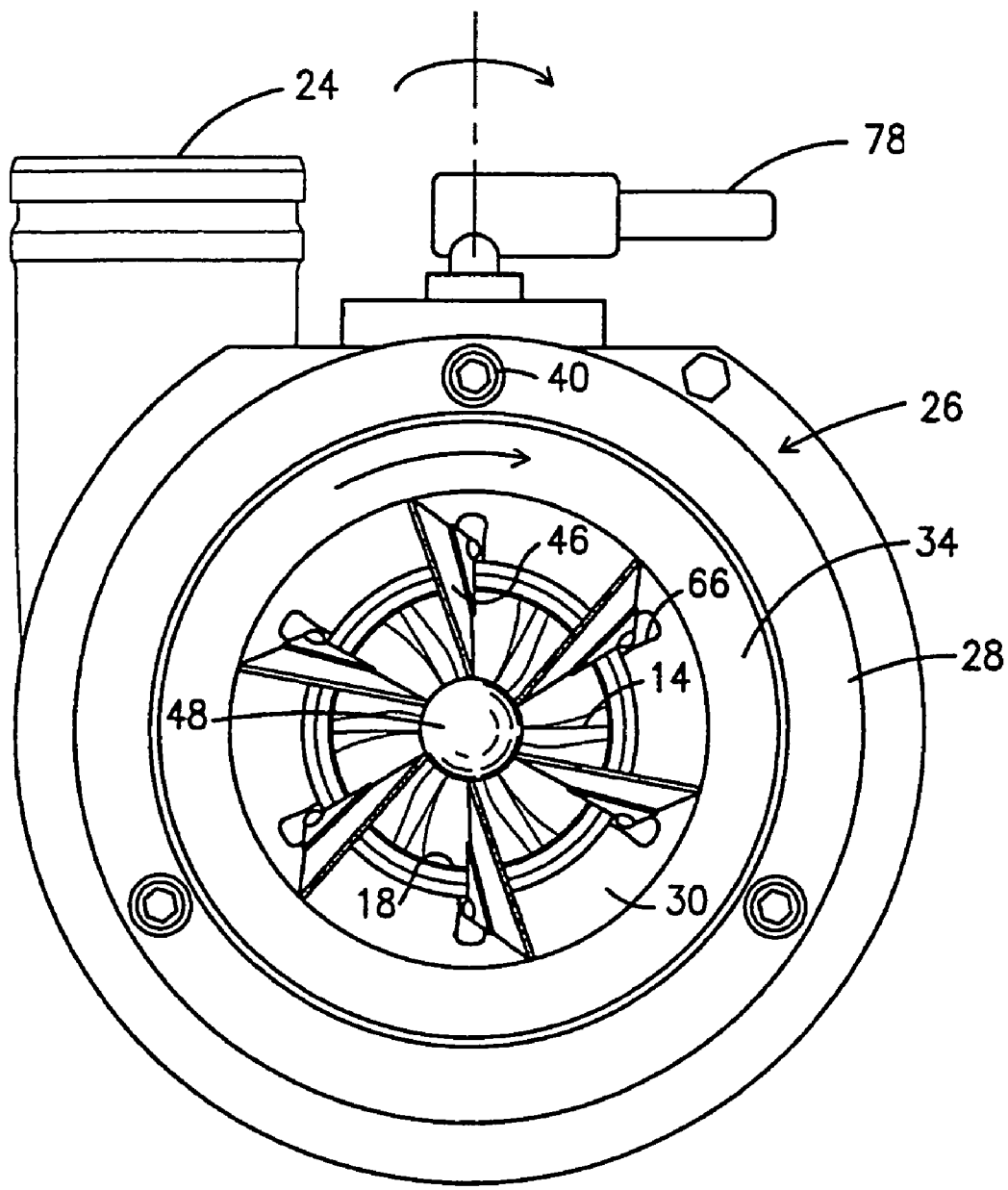
FIG. 3 is a left side elevational view as in FIG. 2, but showing the pre-whirl generating vanes in a deflected position.

In FIG. 3 the annular ring 30 has been rotated in a clockwise direction, and the vanes 46 have been deflected to cause air flowing through the channel 34 to generate a clockwise pre-whirl as it enters the inlet 18 of the compressor. As seen in FIGS. 2 and 3 the compressor wheel 14 rotates in a clockwise direction and the compressor outlet 24 is on the left side of the compressor. Accordingly, the deflection of the vanes 46 shown in FIG. 3 would produce a positive pre-whirl of air supplied to the compressor inlet 18.

It will be appreciated that the annular ring 30 could just as easily be rotated in a counterclockwise direction as viewed in FIG. 3, causing the vanes 46 to be deflected in the opposite direction than that shown in FIG. 3, and generating a counterclockwise, or negative, pre-whirl to the air entering the compressor inlet 18. The amount or deflection is not limited to the amount shown in FIG. 3. Rather, the amount of deflection is limited only by the length of the slot 66 in the ring 30 and can be designed for any desired amount of deflection. Also, by simply turning the arm 78 in one direction or another, the vanes 46 can be changed from providing an extreme positive pre-whirl to an extreme negative pre-whirl, or any position in between, quickly and easily as demanded by engine performance requirements.

FIG. 4 shows an alternative pre-whirl generating vane 80, similar to the vanes 46, but having only a reinforced portion 82 and no hemispherical bearings 70. The vane 80 is shown as being formed separately from the central cowling 48, but it could be formed integrally with the cowling 48 and outer shell 50 of the vane carrier assembly 32, as are the vanes 46. This is also true of the alternative vanes shown in FIGS. 6–13 below. As can be seen in FIG. 5, the reinforced portion 82 of the vane 80 is slightly thinner than the width of the slot 66 so the portion 82 can twist and move axially within the slot 66 when the vane 80 is deflected for generating pre-whirl. If desired, the outer end of the reinforced portion 82 can have an oval or elliptical cross section (as viewed from the top in FIG. 5) to accommodate this motion.

Another alternative pre-whirl generating vane 84 is illustrated in FIGS. 6, 7 and 8 and is similar to vane 80 in that it is shown as a separate vane but could be formed integrally with the central cowling 48 and outer shell 50 if desired. The alternative vane 84 is distinguished by not having a reinforced portion at its trailing edge, but rather, having a double bend or crimp section 86 that serves both to stiffen the trailing edge of the vane 84 and to provide a bearing portion 88 (FIG. 8) on the tab 90 that allows control of the tab 90 by the slot 66 and permits twisting and axial movement of the tab 90 within the slot 66.

Yet another alternative pre-whirl generating vane 92 is illustrated in FIGS. 9 and 10. The alternative vane 92 has a tab 94 that can be received into the slot 66 in the ring 30, and the tab 94 includes a pair of oppositely directed arcuate indentations 96, which are generally hemispherical in shape. The indentations 96 form curved outer surfaces 98 that bear against the inner walls of the slot 66 when the ring 30 is moved to deflect the vane 92 and generate pre-whirl flow. While it will be recognized that a single such arcuate indentation 96 would perform the desired function, the pair of oppositely directed indentations 96 illustrated in FIGS. 9 and 10 is preferred because they provide for better guidance of the tab 94 within the slot 66 in either direction.

Alternatively, as can best be seen in FIGS. 11, 12 and 13, rather than having a tab 64 extend from the vane 46 into a slot 66 in the ring 30, the slot 66 can be eliminated, and the ring 30 can be provided with a pair of tabs 100 extending from the ring 30 into the channel 34 and arranged to be disposed on either side of each vane 102. The vanes 102 do not have a tab extending from their radially outer edge 104.

Rather, the outer edge 104 of the vanes 102 is received between the tabs 100 at about the midpoint of the outer edge 104. Preferably, the inwardly facing surfaces 106 of the tabs 100 are convex (FIG. 10) so that as the ring 30 is rotated in either the clockwise or counterclockwise direction, the tabs 100 will bear against and deflect the vanes 102, and the outer edge 104 of the vanes 102 will be allowed to move axially between the tabs 100.

Figure 14:
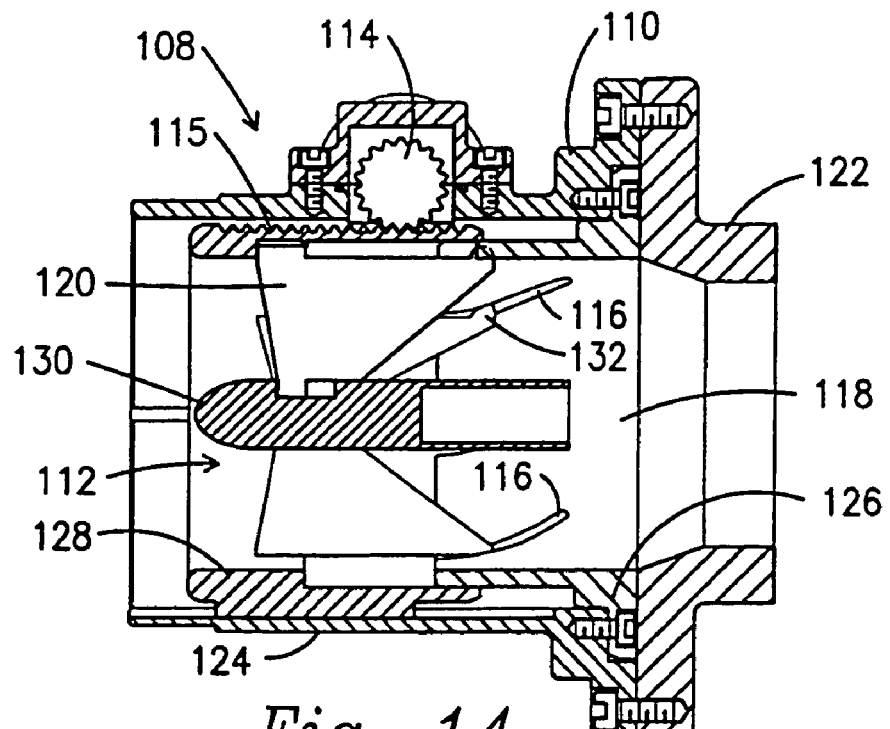
FIG. 14 is a front elevational view, taken in section, of an alternative embodiment of the pre-whirl generator of the present invention.

As mentioned above, one of the principal advantages of the present invention is that it is a lightweight device characterized by simplicity in construction and operation. As mentioned, the device of the previous FIGS. 1 through 13 includes only four basic operative parts: the pre-whirl assembly housing 28, the annular rotatable ring 30, the vane carrier assembly 32, and the beveled pinion gear 72. An alternative form of the present embodiment of the invention is illustrated in FIGS. 14 through 19. As seen in FIG. 14, this form of the pre-whirl assembly, indicated generally at 108, is comprised of only three basic operating parts: a pre-whirl housing 110, a vane carrier, indicated generally at 112, similar to the vane carrier 32 of the above embodiment, and a pinion gear 114 for causing the vane carrier 112 to move telescopically axially toward and away from the pre-whirl housing 110 by cooperation with a rack gear 115 on the vane carrier 112. With this very simple and inexpensive arrangement, the need for a rotatable ring 30 has been eliminated. Instead, a number of generally helical grooves 116 are formed on the inner surface 118 of the pre-whirl housing 110. The grooves 116 serve to guide the trailing edge of vanes 120 in either the positive or negative direction as the vane carrier 112 is moved axially toward and away from the housing 110, as will be described in more detail below.

More specifically, as illustrated in FIG. 14, the pre-whirl housing 110 is comprised of three pieces: an attachment section 122 for attaching to the inlet (not shown) of a turbocharger compressor, an outer housing section 124, and an inner section 126. If desired, two or more of these sections can be cast or otherwise manufactured integrally with one another, or formed as part of the turbocharger body. The interior surface of the inner section and the attachment section combine to form an intake channel for conducting air to the compressor inlet.

As with the embodiment shown in connection with FIGS. 1–13 above, the vane carrier 112 is comprised of an outer shell 128, a number of vanes 120, and a central cowling 130. Preferably, the vanes 120 are formed of a thin sheet metal material and are molded integrally with both the outer shell 128 and the central cowling 130, which can be formed of a durable plastic material. With this arrangement, the leading edge of the vane 120 is secured to the inner wall of the outer shell 128, and the trailing edge of the vane 120 includes a tab 132 that is received in the helical groove 116 formed on the inner surface 118 of the inner section 126 of the housing 110. Unlike the axial slots 66 in the annular ring 30, the grooves 116 in the inner section 126 are angled with respect to the axis of the pre-whirl assembly 108 and therefore cause deflection of the trailing edge of the vane 120 when the vane carrier is moved axially toward or away from the pre-whirl housing 110.

In order to provide axial movement of the vane carrier 112 toward and away from the housing 110, a motor 134 (FIG. 15) is mounted on the housing 110 by a mounting bracket 136. The motor is arranged to drive the pinion gear 114 via a drive shaft 138 connected to the pinion gear 114. When the pinion gear 114 is rotated by the motor 134 in a counter-clockwise direction (as viewed in FIG. 14), the pinion gear 114 will cooperate with the rack gear 115 to urge the vane carrier toward the housing 110, or to the right as viewed in FIG. 14. Conversely, when the pinion gear is turned in the clockwise direction, the vane carrier will be moved to the left, or away from the housing 110.

Figure 15:
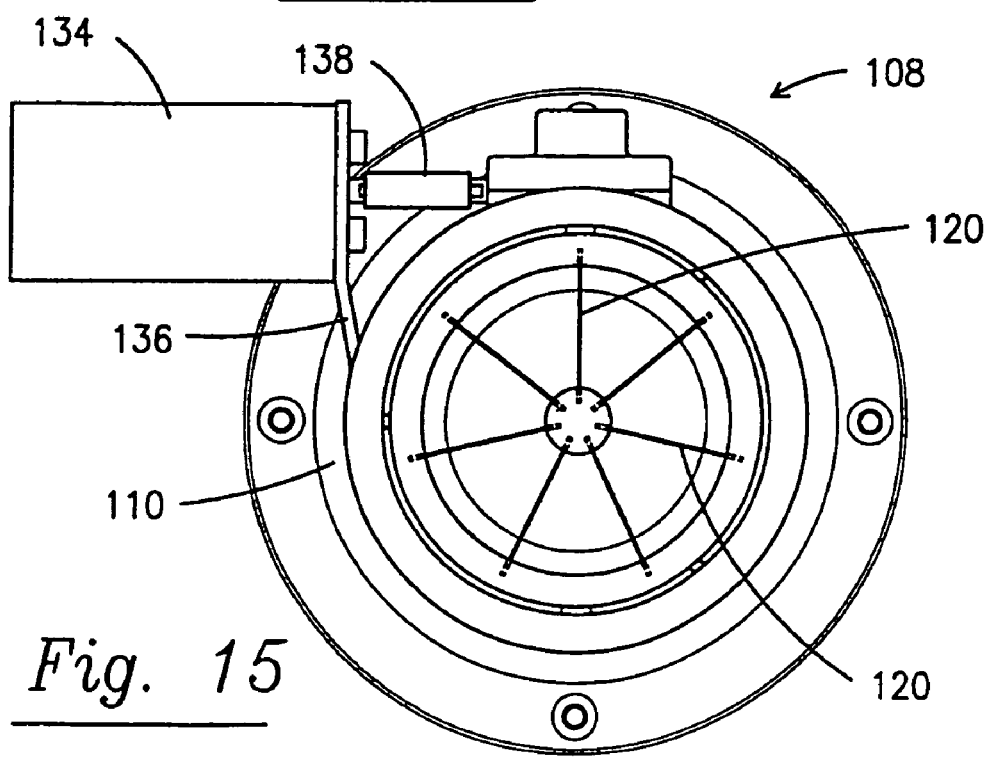
FIG. 15 is left side elevational view of the pre-whirl generator of FIG. 14, showing the pre-whirl generating vanes in their undeflected position.

When the pre-whirl assembly 108 is in the position illustrated in FIGS. 14 and 15, the tab 132 is located in an intermediate position in the groove 116, that is, not at either extreme end of the groove 116, so that at least some movement either toward or away from the housing 110 is still possible. As can best be seen in FIG. 15, in this position, the vanes 120 are aligned with the axis of the housing 110 and do not deflect air passing through the assembly 108.

Figure 16:
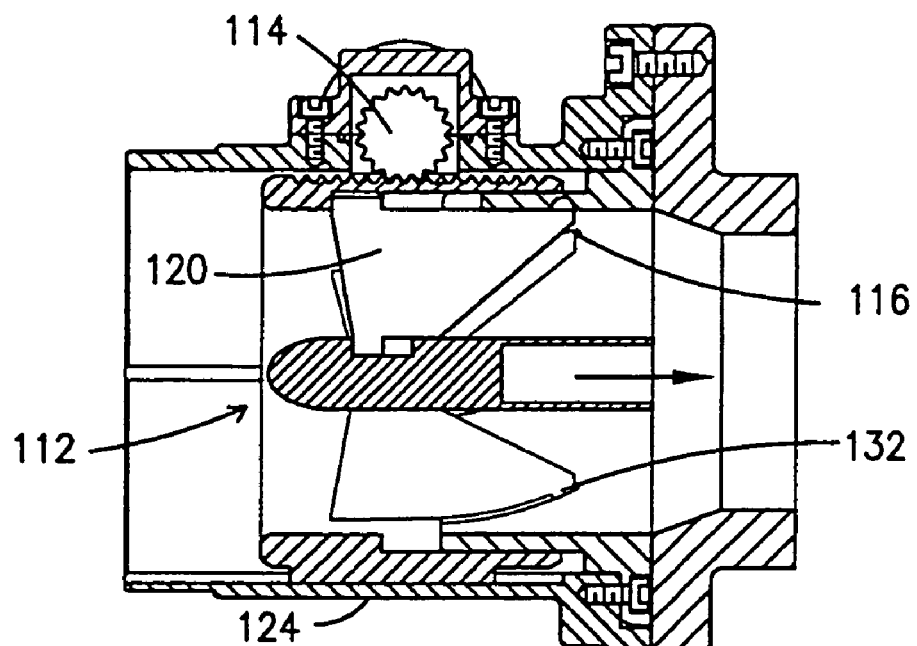
FIG. 16 is a front elevational view, taken in section, of the pre-whirl generator of FIG. 14, but showing the pre-whirl generating vanes deflected in a first direction.

In FIG. 16, the pinion gear 114 has been rotated in the counterclockwise direction, and the vane carrier 112 has been moved to the right (as indicated by the arrow). In this position, the tabs 132 are moved toward the end of the groove 116 nearest the compressor inlet, and maximum deflection is achieved in that direction. It should be understood that the grooves 116 can be arranged to provide any desired amount of deflection in either the positive or negative direction. Moreover, the grooves do not need to provide the same amount of deflection in both directions. Rather, in the preferred embodiment, the grooves 116 are arranged to provide more deflection in the positive pre-whirl direction than in the negative direction.

Figure 17:
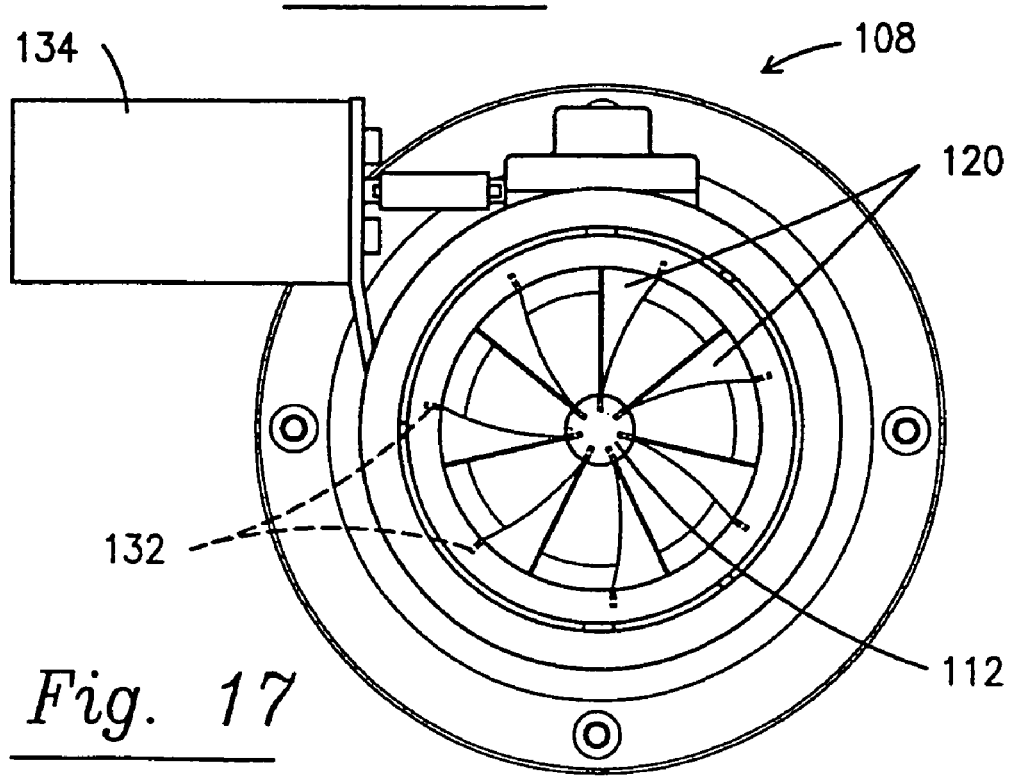
FIG. 17 is left side elevational view of the pre-whirl generator of FIG. 16, showing the pre-whirl generating vanes deflected in a first direction.

FIG. 17 shows the deflection of the vanes 120 when the vane carrier 112 is in the position illustrated in FIG. 16. If we assume for example that the pre-whirl assembly 108 of FIG. 17 is attached to a compressor that rotates in a clockwise direction (as shown in FIG. 2), then the vanes 120 of FIGS. 16 and 17 have been deflected to produce a clockwise, or positive pre-whirl. It is desirable to generate a strong positive pre-whirl by moving the vane carrier toward, rather than away from, the housing, and therefore, the compressor inlet. To accomplish this, the grooves 116 are arranged to create maximum deflection of the vanes 120 in the positive direction, and the vane carrier 112 is moved to a position closest to the compressor inlet when the vanes 120 are in the maximum positive pre-whirl position. This is desirable because a strong positive pre-whirl has been shown to increase compressor performance at relatively low flow rates.

Figure 18:
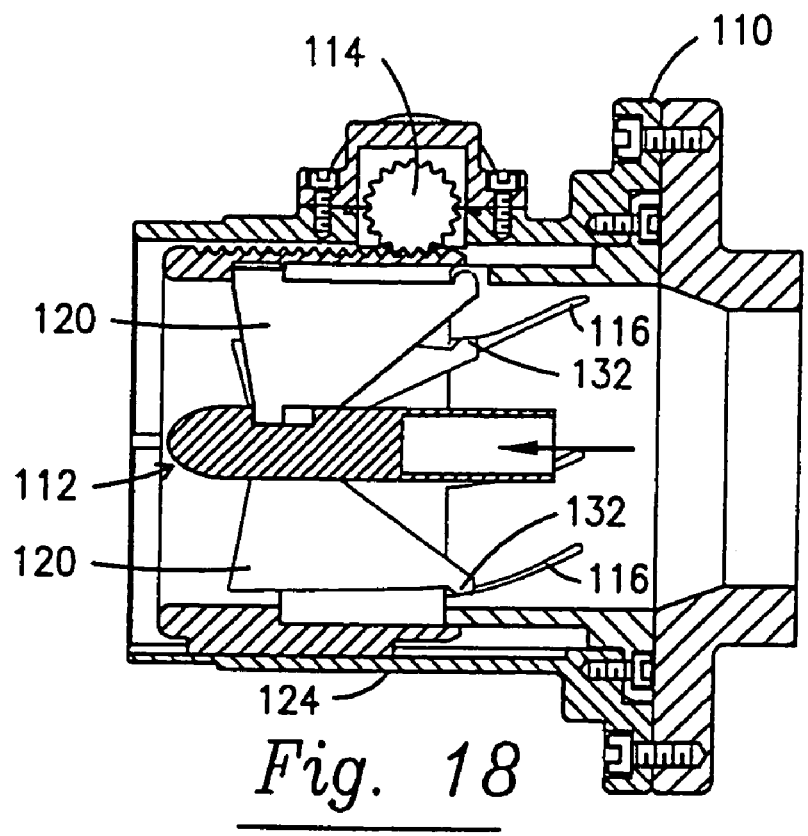
FIG. 18 is a front elevational view, taken in section, of the pre-whirl generator of FIG. 14, but showing the pre-whirl generating vanes deflected in a second, opposite direction.
Figure 19:
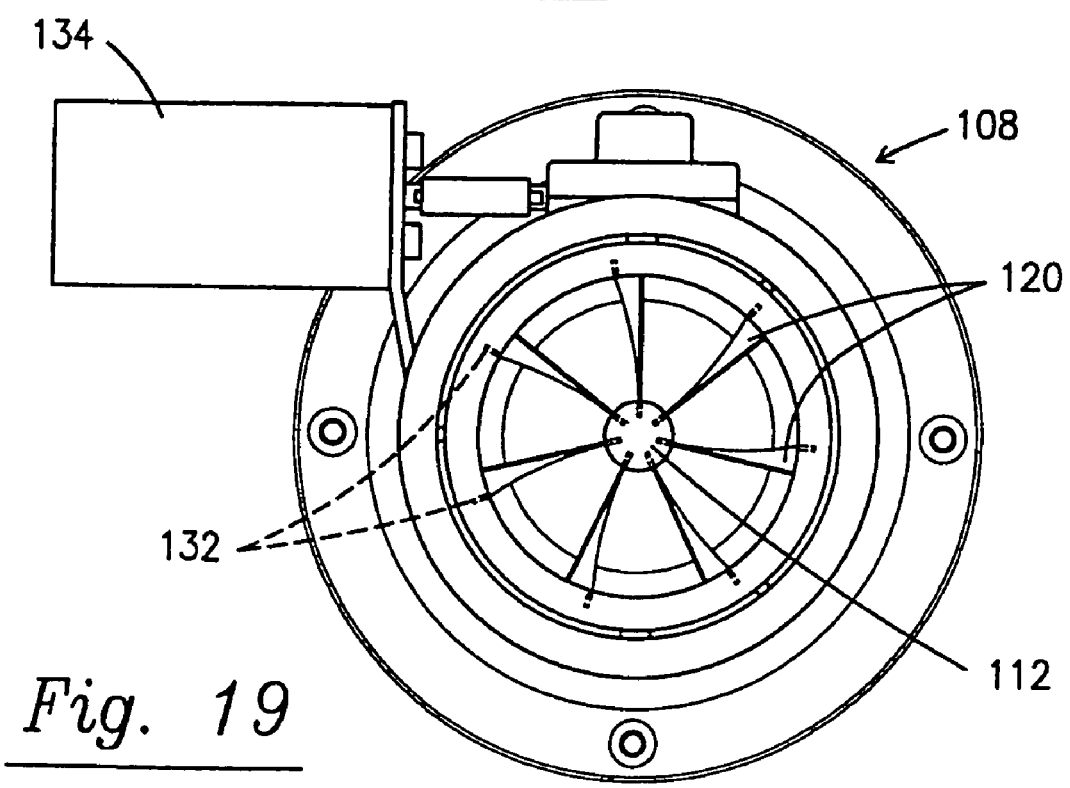
FIG. 19 is left side elevational view of the pre-whirl generator of FIG. 18, showing the pre-whirl generating vanes deflected in a second direction.

If the pinion gear 114 is rotated in a clockwise direction from the position illustrated in FIGS. 16 and 17, the vane carrier is moved to the left, or away from the housing 110 and the compressor inlet. As the tabs 132 proceed along the grooves 116, the deflection of the vanes 120 in the positive direction decreases until the vane carrier 112 reaches the position illustrated in FIGS. 14 and 15, where the vanes 120 are in a neutral position. If the pinion gear 114 is rotated further in the clockwise direction, the vane carrier 112 will move further to the left, as shown in FIGS. 18 and 19, and the tabs 132 will move further to the left in the grooves 116, causing the vanes 120 to be deflected in the negative direction. As mentioned above, the grooves 116 can be designed to create any amount of deflection in either the positive or negative direction, as desired, but preferably, as illustrated, the deflection created in the negative direction is designed to be less than the maximum deflection in the positive direction. This is because it has been shown that even a weak negative pre-whirl can increase the efficiency of a compressor at relatively high flow rates. Accordingly, the grooves 116 illustrated in this embodiment are not a uniform helix, but rather are shaped to provide an exaggerated deflection in the positive direction when the vane carrier 112 is moved toward the housing 110, and a smaller deflection when the vane carrier 112 is moved away from the housing 110.

Figure 20:
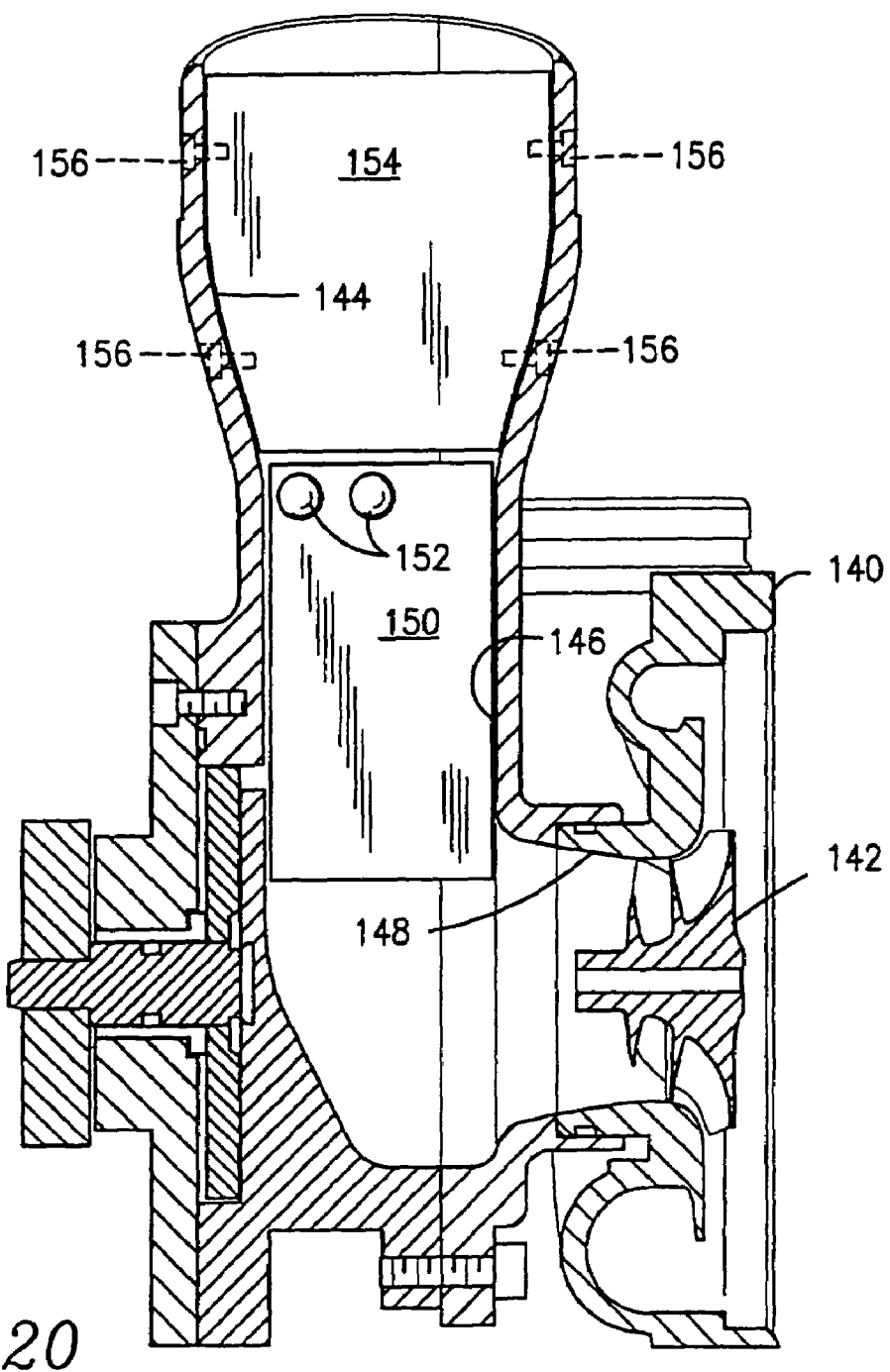
FIG. 20 is a front elevational view, taken in section, of another alternative embodiment of the present invention, shown in connection with a turbocharger compressor.

An alternative embodiment of the present invention is illustrated in FIG. 20, which shows a radial compressor 140 for a turbocharger having a compressor wheel 142 and an intake channel 144 that is arranged generally perpendicular to the axis of the compressor 140 and the compressor wheel 142. A portion 146 of the intake channel 144 is generally rectangular in cross section and is immediately adjacent the compressor inlet 148. A flat, thin, deformable plate 150 is secured at its upstream end to a side wall of the rectangular portion 146 of the intake channel 144 by fasteners 152 in such a way that, in its undeflected position, it is secured along the wall of the channel 144 and is completely out of the flow of air through the channel 144. In order to negate any inadvertent or undesired pre-whirl that may have been set up by the conduit leading to the pre-whirl generator of the present invention, a divider wall 154 can be inserted in the channel 144 immediately upstream of the plate 150. The divider wall 154 can be fastened in place by fasteners 156, or can be cast or molded as an integral part of the channel 144.

Figure 21:
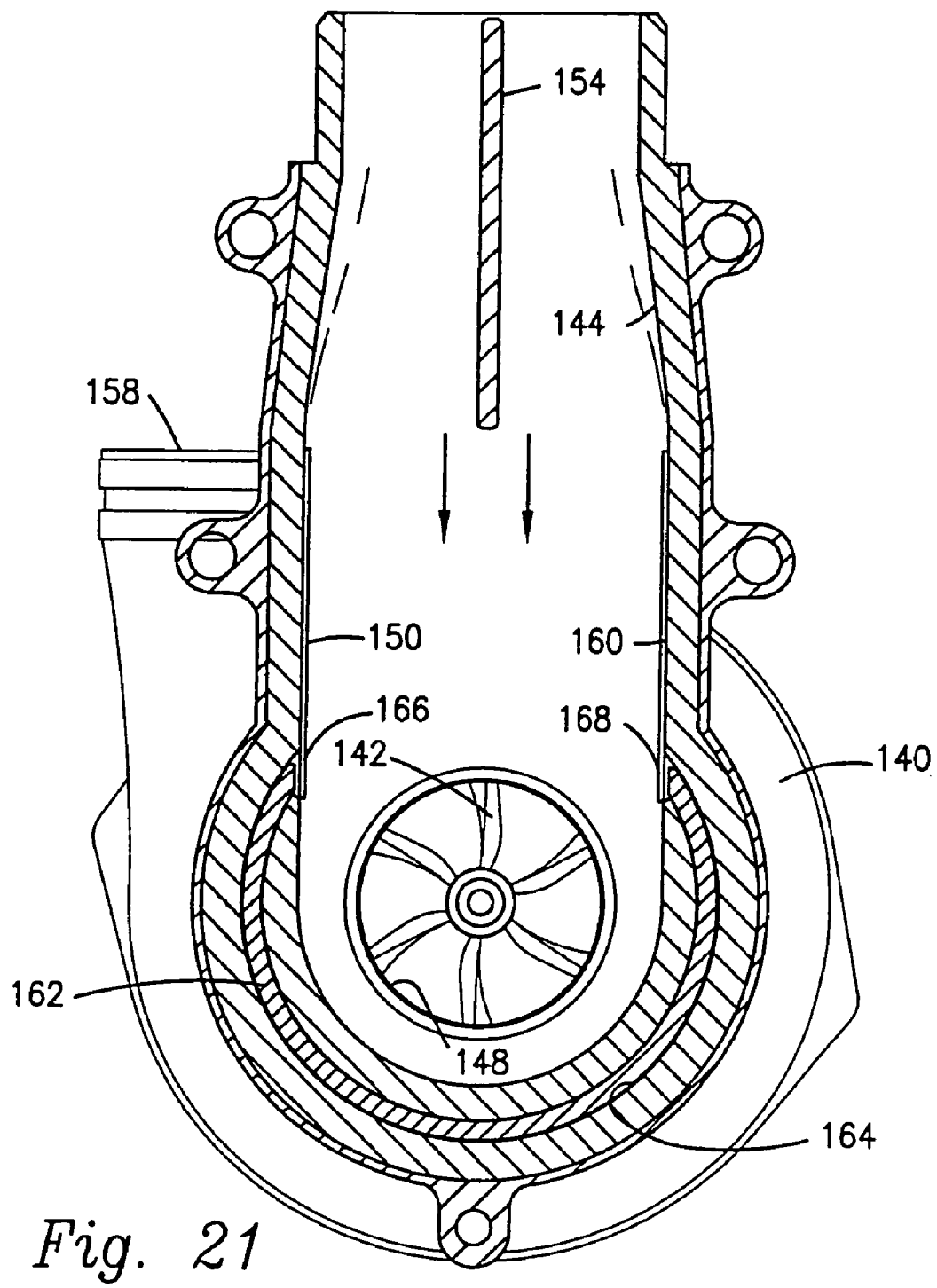
FIG. 21 is a left side elevational view, taken in section, of the pre-whirl generator of FIG. 20, showing the pre-whirl generating vanes in their undeflected position.

As can best be seen in FIG. 21, a radial compressor wheel 142 rotates in a clockwise direction as viewed in FIG. 21 to provide compressed air at the compressor outlet 158. The plate 150 is secured flat against a side wall of the intake channel 144 so that in its undeflected position, the intake channel 144 is completely unobstructed. In addition, a second plate 160 is secured to the opposite wall of the intake channel 144, and in its undeflected position, illustrated in FIG. 21, it is also out of the flow of air through the intake channel 144. A C-shaped actuator 162 is positioned behind the plate 150 and behind the plate 160 in a C-shaped guide recess 164 concentric with the compressor wheel 142. The plates 150 and 160 each have respective trailing edges 166 and 168 positioned immediately adjacent the ends of the C-shaped actuator 162. The divider wall 154 can be seen in cross section in the middle of the channel 144.

Figure 22:
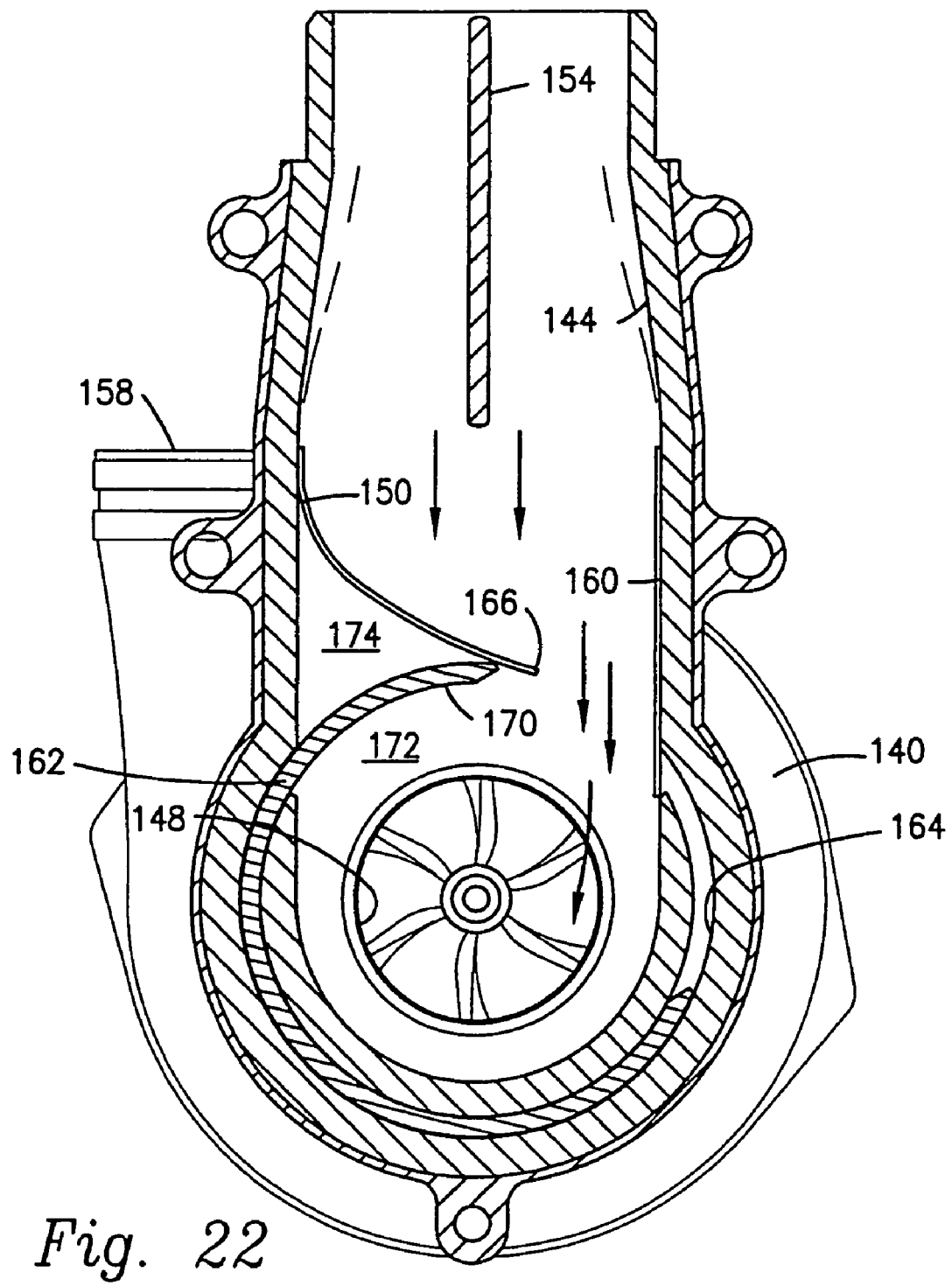
FIG. 22 is a left side elevational view of the pre-whirl generator of FIG. 21, but showing a first vane in a deflected position.

In order to deflect the air flowing through the intake channel 144 in a way to generate pre-whirl to the compressor inlet, as can best be seen in FIG. 22, the C-shaped actuator 162 is rotated in a clockwise direction as viewed in FIG. 22 through the guide recess 164 and into the intake channel 144 forcing the trailing end 166 of the plate 150 into and across the channel 144, causing the plate 150 to form a curved deflector diverting air transversely across the channel 144 and generating a positive pre-whirl at the inlet of the compressor 140. In order to deflect air flowing through the intake channel 144 to generate a negative pre-whirl, as can best be seen in FIG. 23, the C-shaped actuator 162 can be rotated in a counterclockwise direction through the guide recess 164 and into the intake channel 144 forcing the trailing end 168 of the plate 160 into the channel 144 and causing the plate 160 to form a curved deflector diverting air transversely across the channel 144 in a direction opposite that of the plate 150, thereby generating a negative pre-whirl at the inlet of the compressor 140.

While the combination of the C-shaped actuator 162 and the deformable plates 150 and 160 represent the preferred structure for creating the desired pre-whirl flow in this embodiment of the present invention, it will be understood that just the C-shaped actuator 162, or just the plates 150 or 160, using some other actuator, could be used to generate a desired pre-whirl flow. Referring again to FIGS. 22 and 23, when the C-shaped actuator is deployed into the intake channel 144, the inside surface 170 of the C-shaped actuator 162 helps to form a circular chamber 172 immediately adjacent the compressor inlet 148. This circular chamber 172 facilitates smooth pre-whirl flow to the compressor 140. If either of the deformable plates 150 or 160 were not present, the C-shaped actuator 162 would still deflect air flowing through the intake channel 144 to form a positive or negative pre-whirl at the inlet 148. However, a region of eddied or stalled air flow, a "dead zone", would be created in the generally triangular region 174 or 176 defined by the wall of the intake channel 144, the outside of the C-shaped actuator 162, and where either of the deflected plates 150 or 160 would be if they were present. While this arrangement would function to create the desired pre-whirl flow to the compressor 140, the dead zones 174 and 176 would be disruptive to smooth flow in the intake channel 144, and would not permit optimum operation of the pre-whirl generator.

Figure 24:
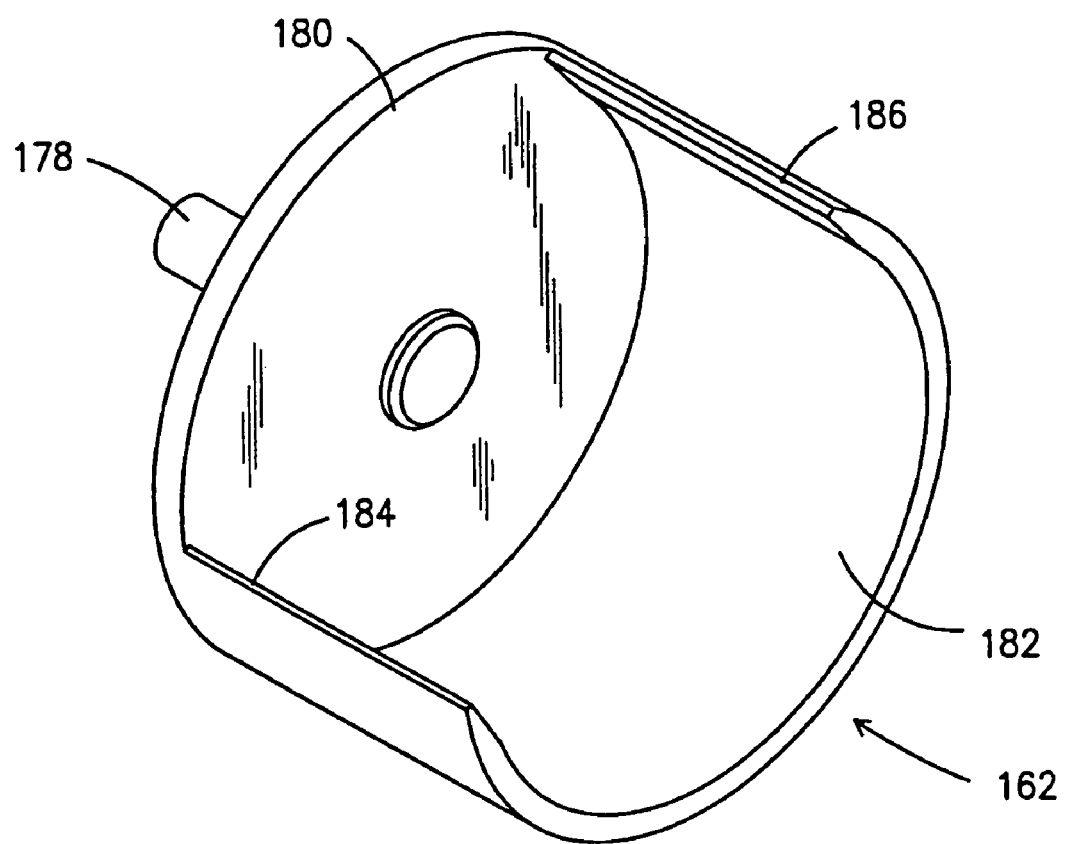
FIG. 24 is a perspective view of the deflecting actuator shown in the embodiments of FIGS. 21, 22, and 23.

The C-shaped actuator 162 is shown in more detail in FIG. 24 and is comprised of a shaft 178 for turning the actuator, a base plate 180, and an actuator blade 182 shaped to travel within the channel 164 and having two broad actuating edges 184 and 186 for contacting the plates 150 and 160, respectively, and deforming them into the channel 144.

In certain circumstances, it may be desirable to be able to generate pre-whirl flow in only one direction. For example, certain compressors will receive only a minimal benefit from generation of a negative pre-whirl at high speed. Also, in many automotive applications, the overriding concern is low cost, and while the benefit of performance enhancement at low speed is valuable, the benefit of a small improvement at high speed may not be worth additional cost. In those applications, it may be desirable to provide a low cost pre-whirl generator that can only generate pre-whirl in one direction, usually the positive direction.

Figure 23:
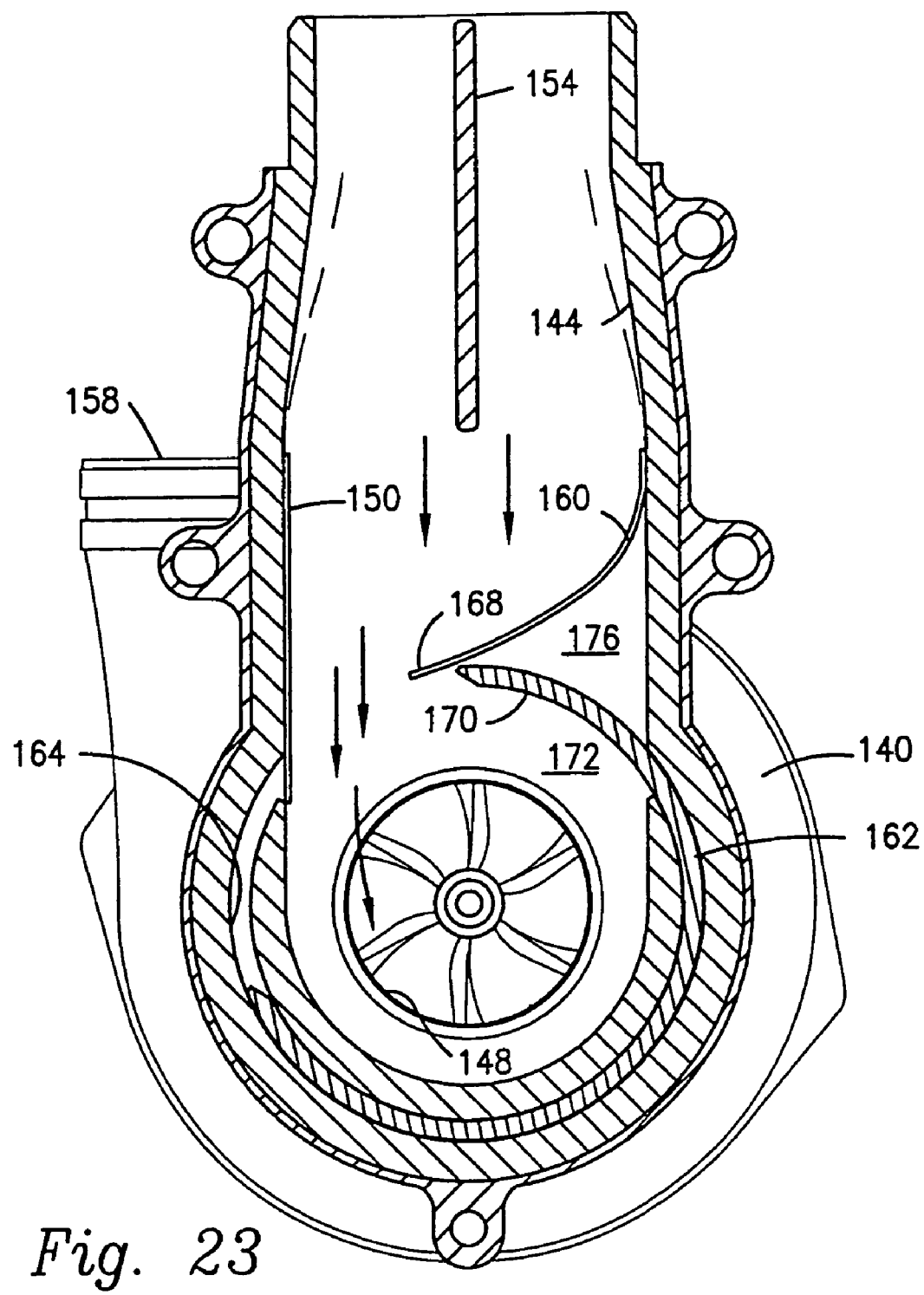
FIG. 23 is a left side elevational view of the pre-whirl generator of FIG. 21, but showing a second vane in a deflected position.
Figure 25:
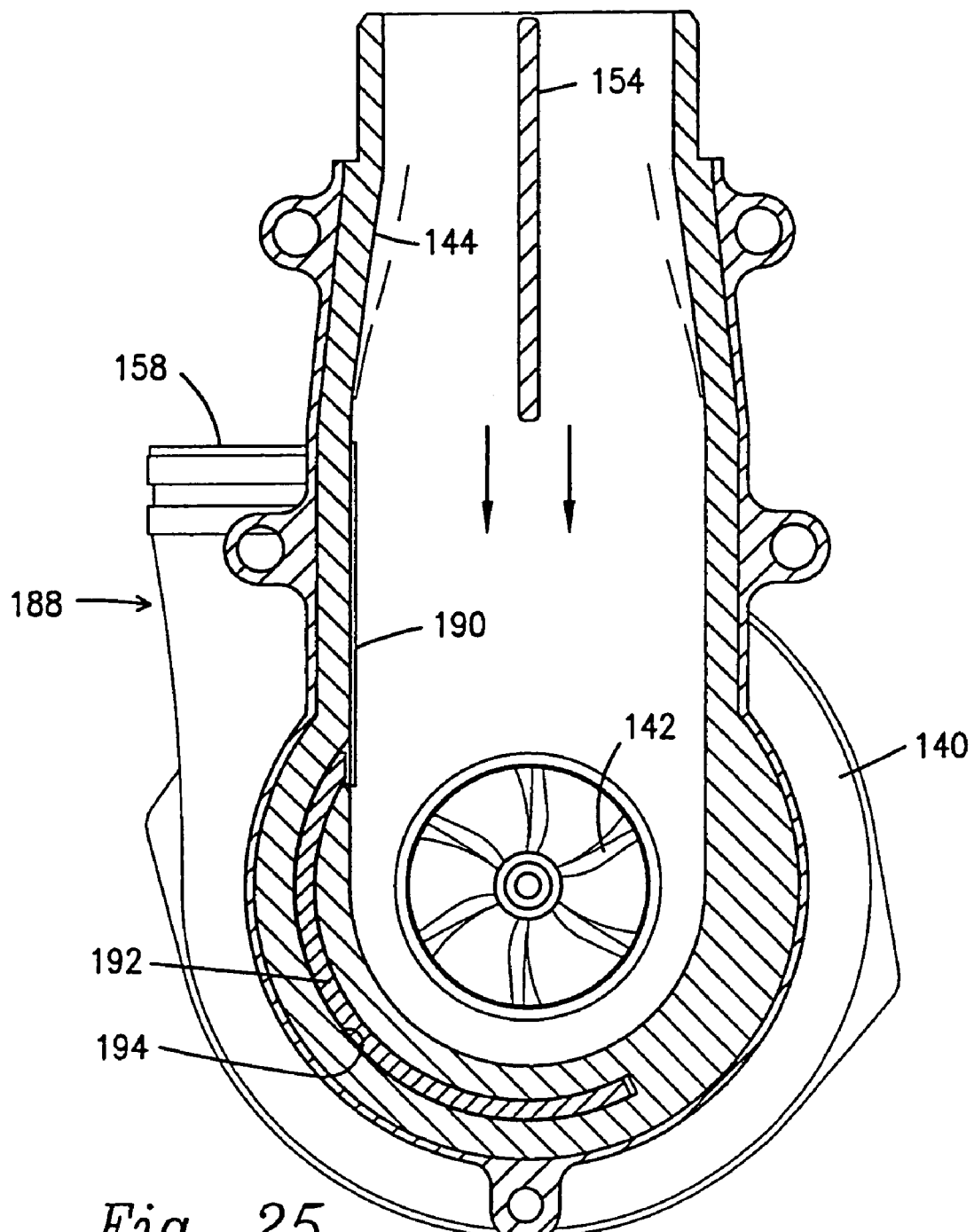
FIG. 25 is a left side elevational view, taken in section, of a pre-whirl generator as in FIG. 21, but having only a single pre-whirl generating vane and showing the pre-whirl generating vane in its undeflected position.
Figure 26:
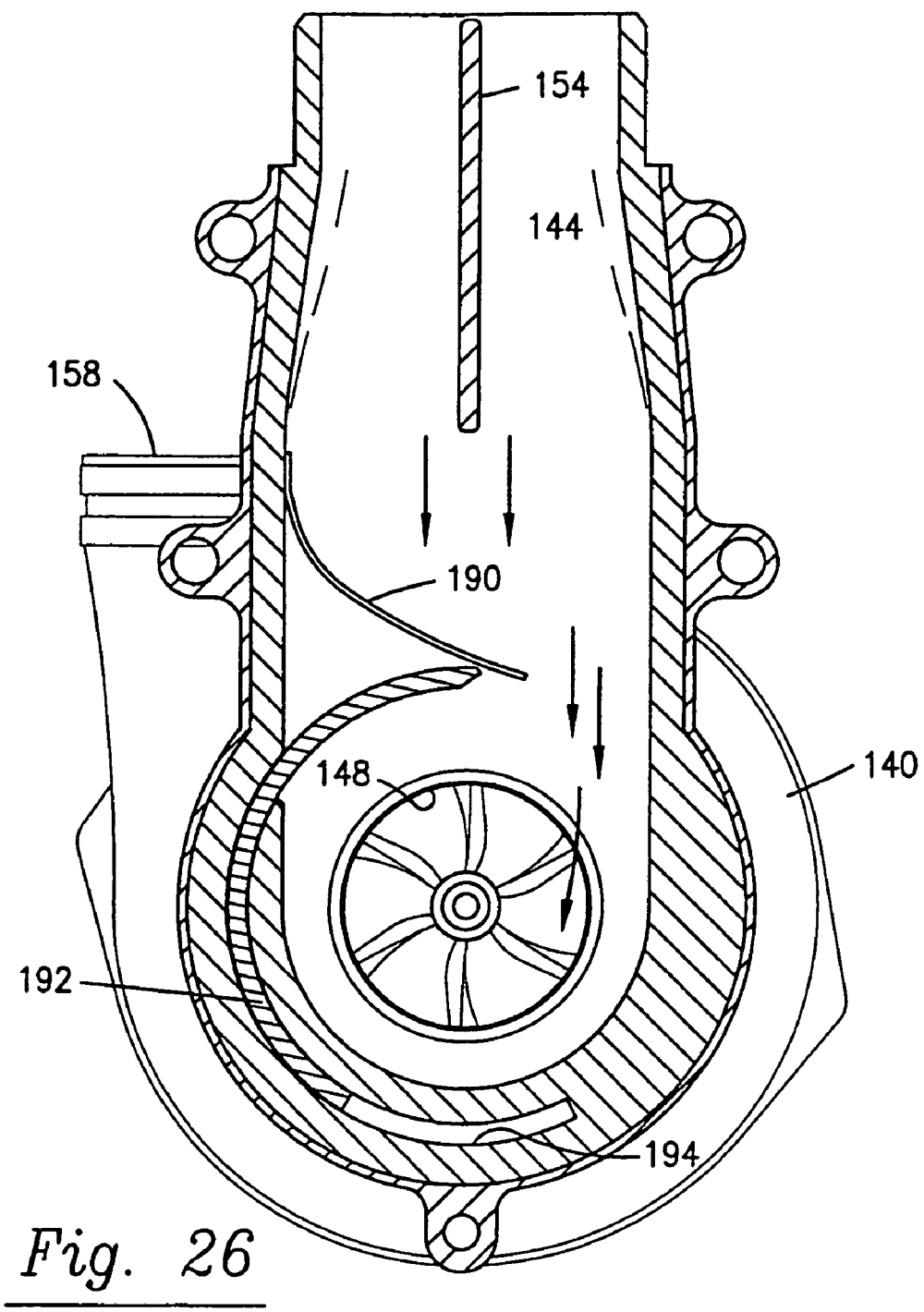
FIG. 26 is a left side elevational view, taken in section, as in FIG. 25, but showing the pre-whirl generating vane in a deflected position.

For this purpose, as shown in FIGS. 25 and 26, a pre-whirl generator 180 is shown, similar to the embodiment of FIGS. 21 through 23, but having only one deformable plate 190. In this instance, the pre-whirl generator 188 is provided with a modified C-shaped actuator 192 that has a blade only on one side of the actuator 192 and which travels in a guide recess 194 that extends only half way around the compressor wheel 142. As can be seen in FIG. 26, when the C-shaped actuator 192 is rotated clockwise, it deflects the plate 190 transversely across the channel 144 to create a positive pre-whirl to the compressor inlet 148.

Similarly, as stated above, the deformable plate 190, using some other actuator, could be used to generate a desired pre-whirl motion to the air as it enters the compressor 140. In the alternative form of actuator shown in FIGS. 27 and 28, a fragmentary portion of the intake channel 144 is shown having a single deformable plate 196 secured to one side of the channel 144. Rather than having a C-shaped actuator to cause deflection of the plate 196, an arcuate deflecting actuator 198 is positioned to pass through an opening 200 in the wall of the channel 144 adjacent the trailing edge 202 of the plate 196. The deflecting actuator 198 is supported at the end of a swing arm 204 that is rigidly secured to and pivots in response to rotation of shaft 206 at its other end. When the swing arm 204 and actuator 198 are in the position shown in FIG. 27, the plate 196 lies flat against the wall of the channel 144, and no deflection of air passing through the channel occurs. When the shaft 206 is rotated slightly in the counterclockwise direction, the arcuate actuator 198 moves into the channel 144 and deflects the plate 196 into the stream of air passing through the channel 144, as shown in FIG. 28.

While this structure has the advantage of being extremely simple and lightweight, and this action of the actuator will have the effect of generating a desired pre-whirl flow to the compressor (not shown), this structure has the disadvantage that it will tend to create a dead zone 208 of stalled air behind the plate 196.

To overcome this problem, other alternative actuators can be used. An alternative form of actuator and deflector for use in the intake channel 144 is illustrated in FIGS. 29 and 30. In this example, a flexible membrane 210 is attached to become part of the wall of the intake channel 144. Preferably, a second flexible membrane 212 is attached on the opposite wall of the channel 144, opposite the first membrane 210. The membranes 210 and 212 can be made from any suitable flexible material such as rubber or a synthetic rubber such as neoprene. A pivotable actuator 214 is disposed outside of the channel 144 and can be rotated toward and into the membrane 210, forcing the membrane 210 into the channel 144 to deflect air passing to the compressor. Preferably, the actuator 214 has an apex 216 that, when fully rotated into the channel 144, bears against the membrane 210 approximately at its midpoint, forcing the midpoint of the membrane 210 into the channel 144. When the actuator 214 is rotated away from the membrane 210, as shown in FIG. 30, the elastic memory of the membrane 210 causes it to assume the same shape as the wall of the channel 144, thereby not deflecting air passing through the channel 144. When the actuator is moved to its membrane deflecting position shown in FIG. 29, the membrane 210 is deflected into the channel 144 as noted above.

In a like manner, if desired, a similar actuator 218 having an apex 220 can be mounted in actuating association with the second membrane 212. By selectively rotating one or the other (or neither) of the actuators 214 and 216, a pre-whirl flow to the compressor inlet can be generated in either the positive, neutral, or negative direction. Moreover, as can be seen in FIGS. 29 and 30, when either the membrane 210 or 212 is deflected into the intake channel 144, the downstream portions 222 and 224 of the membranes 210 and 212 help to shape part of a pre-whirl chamber 226 that is conducive to pre-whirl flow adjacent the inlet 148 to the compressor 140. That is, the downstream portions 222 and 224 of the membranes 210 and 212 block off a space that would otherwise have become a dead zone behind the deflectors formed by the membranes 210 and 212.

Yet another form of actuator and deflector for use in the intake channel 144 is shown in FIGS. 31, 32, and 33. In this form of actuator and deflector, an upper deformable plate 228 is secured to the inside wall of the channel 144 so that in its undeflected position, it is not extending into the flow of air in the channel. A lower plate 230 is connected to the upper plate 228 by a hinge 232. The lower end of the lower plate 230 is slidably secured to the wall of the channel 144 by a pin 234 being received in a slot 236 in the wall of the channel 144. An arcuate deflecting actuator 238, similar to the actuator 198 shown in FIGS. 27 and 28, is arranged outside of the channel 144 and is capable of extending through the wall of the channel 144 to contact the hinge 232. When the actuator is rotated into the channel 144, using a mechanism similar to that employed with the actuator 198, the upper plate 228 is deflected into the channel 144 causing deflection of the air passing through the channel. As can best be seen in FIG. 32, as the upper plate 228 is deflected into the channel 144, the upper end of the lower plate 230 rotates about the hinge 232, and the lower end of the plate 230 moves upwardly along the wall of the channel 144 being guided along the slot 236 by engagement of the pin 234 in the slot 236. With this arrangement, when the upper plate 228 is in its air deflecting position in the channel 144, the lower plate 230 helps to form a pre-whirl chamber 240 adjacent the inlet 148 of the compressor 140. That is, the lower plate 230 helps to create a smooth pre-whirl circulation in the chamber 240 by blocking a space that would otherwise have been a dead zone behind the deflecting upper plate 228 causing disruption to smooth pre-whirl flow in the chamber 240.

In the preferred form of this latest actuator and deflector, a second set of upper and lower plates 242 and 244 are arranged on the opposite side of the channel 144. A hinge 246 connects the upper and lower plates 242 and 244, and the lower end of the lower plate is slidably secured to the wall of the channel 144 by a pin 248 being received in a slot 250. An arcuate actuator 252 is arranged to bear against the hinge 246 for the purpose of deflecting the second upper plate 242 into the channel 144. This second set of upper and lower plates 242 and 244, and their respective actuator 252 function in the same manner as set forth above with respect to the plates 228 and 230. That is, if the actuator 238 is retracted from the channel 144 and the second actuator 252 is rotated into the channel 144, as is shown in FIG. 33, then air will be deflected to form a pre-whirl in a direction opposite that formed when the first actuator 238 is deployed alone, as shown in FIG. 32.

Figure 34:
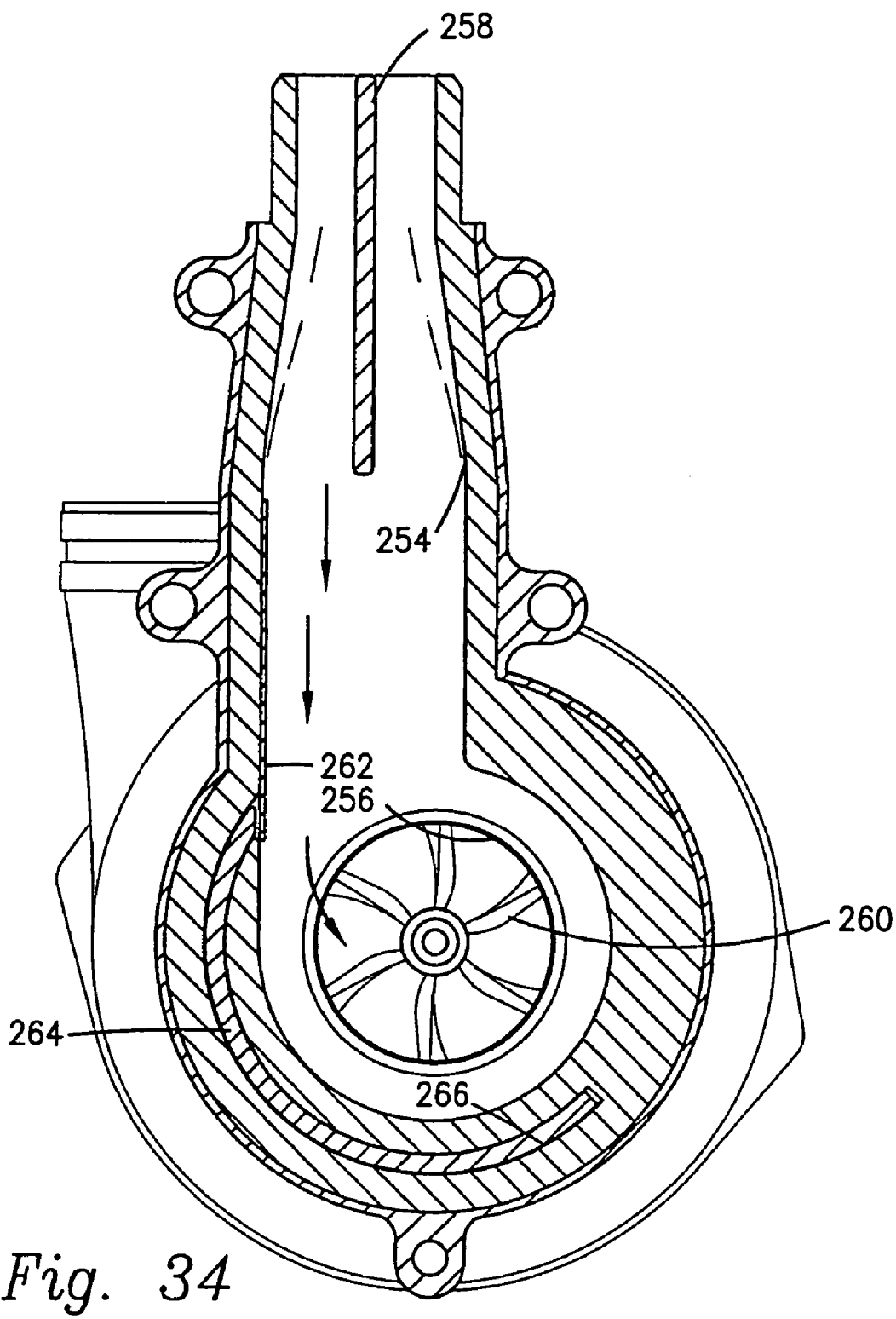
FIG. 34 is a left side elevational view, taken in section, of a further embodiment of the present invention in which the intake channel to the compressor is eccentric to the compressor inlet, and a single deformable deflector is shown in an undeflected position.
Figure 35:
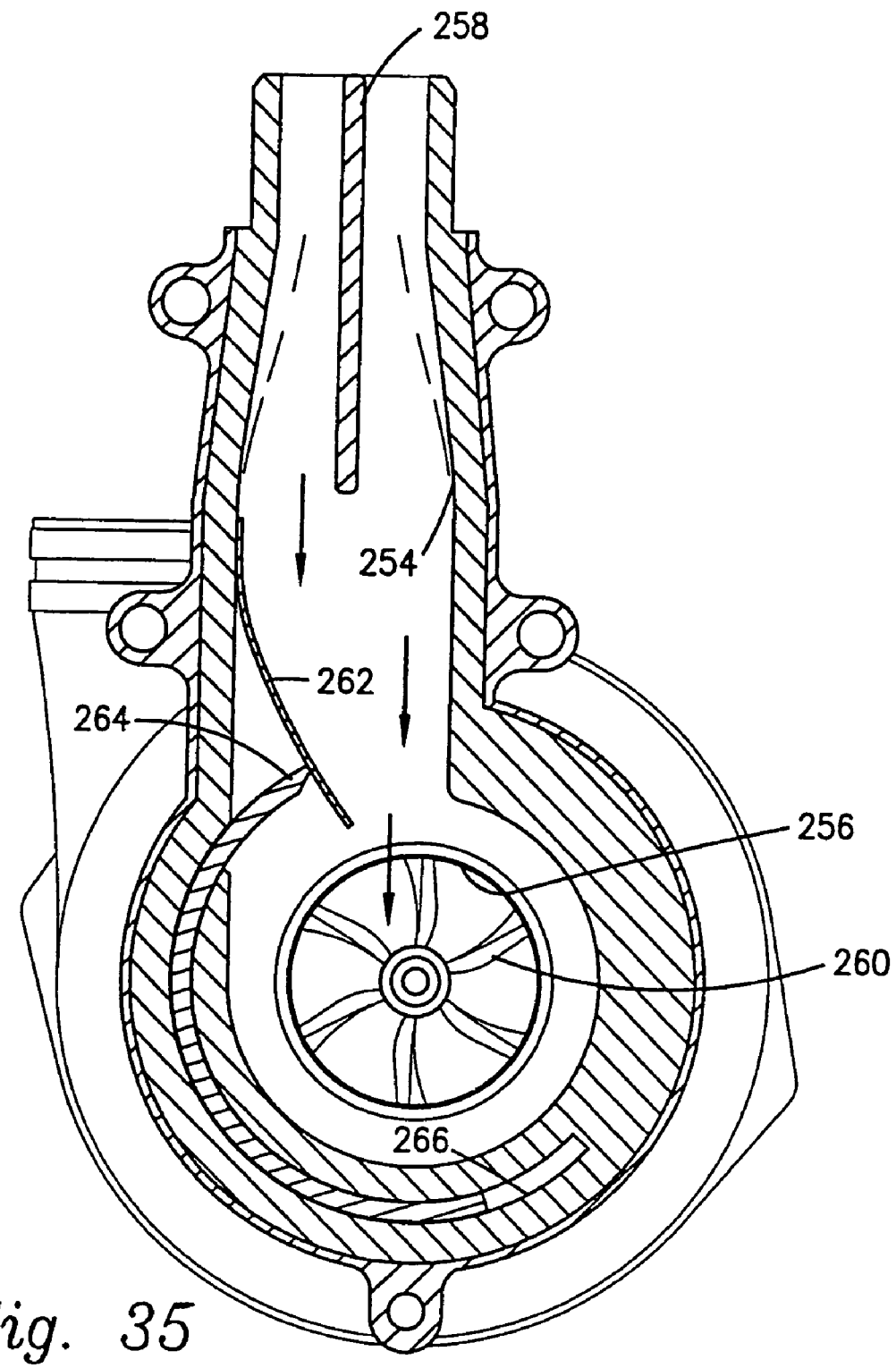
FIG. 35 is a left side elevational view, taken in section, as in FIG. 34, but with the deflector shown in a partially deflected position.
Figure 36:
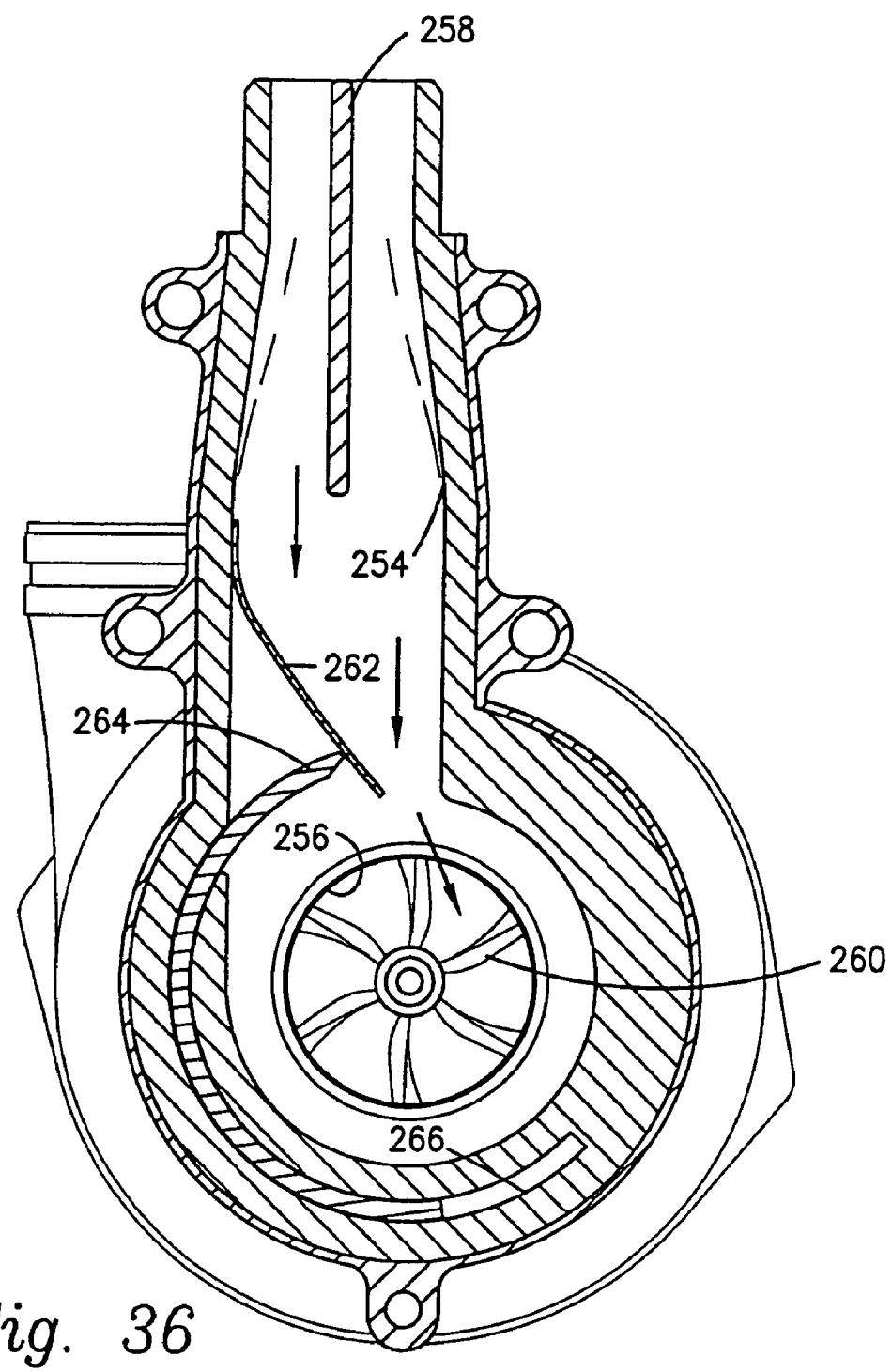
FIG. 36 is a left side elevational view, taken in section, as in FIG. 34, but with the deflector shown in a fully deflected position.

In yet another embodiment of the present invention, shown in FIGS. 34, 35 and 36, the intake channel 254 leading to the compressor inlet 256 includes a divider wall 258 and is arranged eccentrically to the compressor inlet 256. In the case illustrated in FIG. 34, the eccentric inlet channel 254 is positioned so that if air were received through the channel 254 unobstructed by any diverting vane, the air would form a vortex in a counterclockwise direction. In the example illustrated, this would be a negative pre-whirl vortex, since the compressor wheel 260 rotates in a clockwise direction as viewed in FIG. 34. This counterclockwise vortex creates a relatively weak negative pre-whirl because the incoming air is not highly directed, but it has the advantage of unobstructed flow through the channel 254, and as discussed above, a relatively weak pre-whirl is acceptable in high speed, high flow rate conditions.

As in the embodiment shown in FIGS. 25 and 26, this embodiment of the invention includes a single deformable vane 262 along the wall of the intake channel 254 furthest from the center of the compressor wheel 260. With the vane 262 in its undeflected position as shown in FIG. 34, the supply air will form a vortex, or negative pre-whirl, as described above. Also as shown in the embodiment illustrated in FIGS. 25 and 26, this embodiment has a C-shaped actuator 264 that moves through a C-shaped guide recess 266 concentric with the compressor wheel 260. When the vane 262 is partially deflected, as shown in FIG. 35, the vortex pre-whirl will be substantially suppressed, eliminating any pre-whirl to the compressor inlet 256. As the vane 262 is deflected further, as shown in FIG. 36, it will generate a strong pre-whirl motion to the incoming air in a direction opposite to the previous undeflected vortex, or in this example, a positive pre-whirl.

As shown in FIG. 1, the tabs 52 are inserted into a recess or groove of the outer shell 50 of the channel 34. It has also been mentioned that this outer shell 50, the vanes 46 and the cowling 48 may be formed as a unitary vane carrier assembly 32, for purposes of assembling the pre-whirl generating assembly 26 in an easy and inexpensive way. FIG. 37 shows a preferred realization of this conception.

To this end, an outer fixing ring 265 (and, if desired the attached tab 52) may be provided to be inserted into the above-mentioned groove into which also the tabs 52 of the leading edge are inserted. At the radial inward side of the vanes, there may be an inner fixing ring 266 (at a larger scale seen in FIG. 39 where its outer periphery is indicated in dash-dotted lines) connected to the vanes 46 via an inner tab 267. A similar tab is shown in FIG. 1 and engages a recess or groove of the cowling 48. This groove of the cowling 48 may, according to the embodiment of FIG. 37, receive at least the inner fixing ring 266 and, if desired, the attached inner tab 267. It is suitable, if an interconnection portion 269 interconnects the tab 267 and the inner ring 266 to facilitate bending.

If it is desired to hold the outer fixing ring 265 and to center it in another way than by inserting it into a centering groove, it could be fixed to the shell 50, e.g. in a radial slot of the shell 50, by means of screws or bolts penetrating holes 270 in the outer fixing ring. Alternatively, but not preferred, bolts can be provided instead of the holes 270 to be inserted into corresponding holds of the shell 50. Furthermore, it may be seen from FIG. 37 that the holes 270 are formed in an inwards extending tab 271 of the outer fixing ring 265, although it would, in principle, be possible to form these holes in the ring 165 directly without providing such tabs 271. In this latter case, however, the strength of the fixing ring 265 would be reduced for which reason providing tabs 271 is preferred. Moreover, the invention is not restricted to inwards extending tabs 271, but tabs projecting to the exterior of the ring 265 could also be used. However, inwards extending tabs are preferred, because the use of them reduces scrap and diminishes the amount of material necessary for one unit 32'. In principle, the holes 270 could be replaced by indentations or other recesses cooperating with corresponding axial protrusions of the shell 50. In any case, such axial recesses and protrusions fix the ring 265 against any tendency of rotation.

It has been mentioned that the holes 270 could be used to receive bolts for fastening the vanes. This involves some labor for providing threaded borings and to screw the bolts into them to fasten the ring 265. This can be achieved with less work, if the ring 265, e.g. after inserting it into the shell 50, is simply molded by injecting plastic material around it. In this case, not only the holes 270, but also holes 52' in the tabs 52 are suitable, because they ensure entering the plastic material into them and, thus, a better and positive interconnection. Likewise, tabs 267 may also comprise holes 272 (FIG. 39).

The advantage of a construction according to FIGS. 27 to 39 is that the vanes 46, their inner and outer tabs 52 and 267, as well as the outer and inner fixing rings 265 and 266 (or at least one of them) may be integrally formed as a unitary assembly 32'. Manufacture can be done either by laser-cutting (preferred) and/or by punching which ensures a cost effective way of production. It may be seen in FIG. 37 that the radial outer tabs 52 are preferably attached to the outer fixing ring 265 through an approximately L-shaped interconnecting portion 268 which ensures an enhanced flexibility of the vanes 46 with respect to the fixing ring 265. Although various materials can be used to produce such an assembly 32', it is preferred to have it made from sheet metal. However, it would also be possible to form at least one of the rings 265, 266 of plastic material and to cast the tabs or interconnecting into this plastic material. In a preferred embodiment, however, all parts shown in FIG. 37 are of sheet metal.

As soon as the flat assembly 32' of FIG. 37 has been made, it is easy to bend the trailing edges of the vanes, which comprise the trailing tab 64, out of the plane of FIG. 37 and backward as shown in FIG. 38. The function of the L-shaped interconnecting portions 268 which facilitate bending is clearly understandable from this figure. Therefore, it will also be understood that a similar interconnection portion could also be provided to connect the inner tabs 267 with the inner ring 266, although this will, in general, not be necessary. As seen in FIG. 37, the interconnection portions or webs 268 and 269 are smaller than the tabs 52 and 267. As an alternative, the fixing elements could merely consist of the interconnection portions 268 or 269 extending in radial direction to be directly connected either to the shell 50 and/or to the cowling 48 (e.g. be inserting these portions into corresponding holes) without the fixing rings 265 and/or 266. It will, however, be clear to those skilled in the art that the use of fixing rings allows a more stable construction.

From the foregoing, it is clear that the invention relates also to a method of manufacturing a pre-whirl arrangement which consists of cutting the profile of the vanes 46 together with at least one interconnecting ring 265 and/or 266 by laser-cutting and/or stamping from sheet material, preferably sheet metal, and subsequently bending the vanes 46 out of the plane of the cute sheet material, preferably in the way and with the details mentioned above.

With the arrangement according to the present invention, an extremely simple and lightweight mechanism is provided that permits complete control of the flow of supply air to a radial compressor to generate positive, negative, or no pre-whirl, as required by engine operating demands. This is accomplished with a minimum of moving parts making the pre-whirl generator of the present invention inexpensive to manufacture and reliable and durable in operation. It is clear that this invention comprises also a method of forming the pre-whirl arrangement by laser-cutting and/or punching, as described above.

Various modifications and changes may be made by those having ordinary skill in the art without departing from the spirit and scope of this invention. Therefore, it must be understood that the illustrated embodiments of the present invention have been set forth only for the purpose of example.

The words used in this specification to describe the present invention are to be understood not only in the sense of their commonly defined meanings, but to include by special definition, structure, material, or acts beyond the scope of the commonly defined meanings. The definitions of the words or elements are, therefore, defined in this specification to include not only the combination of elements which are literally set forth, but all equivalent structure, material, or acts for performing substantially the same function in substantially the same way to obtain substantially the same result.

For example, instead of a stationary pre-whirl arrangement, a moving one, such as a rotating one, could be used. Such a movable pre-whirl arrangement could comprise a two-partite cowling, the two parts of which being screwed into one another, wherein one of the cowling parts has the trailing ends of the vanes affixed. Thus, the vanes 46 could rotate together with the cowling 48 (e.g. under the influence of the air flow), but when either one of the two parts is braked, the two parts screw either into one another or from one another, adjusting in this way the position of the vanes. An alternative movable arrangement could be formed in a similar way as lawn irrigators where a moveable surface disturbs the water jet intermittently.

In addition to the equivalents of the elements, obvious substitutions now or later known to one of ordinary skill in the art are defined to be within the scope of the defined elements. For example, it would be conceivable to fix the trailing edges of the vanes, while displacing and pivoting the leading edges, although this will, in general, not be preferred.

We claim:

1. An apparatus for generating pre-whirl of supply air to an inlet (18) of a radial compressor (12-22) comprising:
   a housing (28) for said pre-whirl generating apparatus (26), said housing (28) being mounted adjacent to said inlet (18) of said compressor (12-22) and forming an intake channel (34) for supply air in communication with and leading to said inlet (18).
   a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and
   means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said means for deflecting said vane (46) is an annular ring (30) within said housing (28) arranged to rotate around said channel (34) in a plane perpendicular to the direction of said air passing through said channel (34), said ring (30) being in contact with said vane (46) to mechanically deflect said vane (46) either in a positive or negative pre-whirl direction in response to rotation of said ring (30) around said channel (34), wherein said ring (30) has at least two tabs extending radially inwardly to receive said vane (46) therebetween and to effect deflection of said vane (46) upon rotation of said ring (30).

2. The apparatus of claim 1, wherein said vane (46), in its undeflected position, is arranged in line with normal flow through said channel (34) and does not deflect air flowing through said channel (34).

3. The apparatus of claim 2, wherein said trailing edge (62) of said vane (46) can be deflected in a first direction to generate said positive pre-whirl flow or in a second direction to generate said negative pre-whirl flow.

4. The apparatus of claim 1, wherein said trailing edge (62) of said vane (46) is reinforced for stiffness.

5. The apparatus of claim 4, wherein said trailing edge (62) is an area of increased thickness of said vane (46) along said trailing edge (62).

6. The apparatus of claim 4, wherein said trailing edge (62) has a crimp along said trailing edge (62).

7. The apparatus of claim 1, wherein said means for deflecting said vane (46) is an annular ring (30) within said housing (28) arranged to rotate around said channel (34) in a plane perpendicular to the direction of said air passing through said channel (34), said ring (30) being in contact with said trailing edge (62) of said vane (46) to mechanically deflect said trailing edge (62) of said vane (46) either in a positive or negative pre-whirl direction in response to rotation of said ring (30) around said channel (34).

8. The apparatus of claim 7, wherein said ring (30) contacts said trailing edge (62) of said vane (46) at a contact area near the radially outer corner of said trailing edge (62) of said vane (46), said contact area is received in a generally axially oriented slot (66) in said ring (30), whereby upon rotation of said ring (30) in a first positive direction around said channel (34), said vane (46) is deflected to a position that deflects air flowing through said channel (34) into a positive pre-whirl flow at said inlet (18), and upon rotation of said ring (30) in a second negative direction around said channel (34), said vane (46) is deflected to a position that deflects air flowing through said channel (34) into a negative pre-whirl flow at said inlet (18).

9. The apparatus of claim 1, wherein said vane (46), in its natural undeflected position, is arranged in line with normal flow through said channel (34) and does not deflect air flowing through said channel (34).

10. The apparatus of claim 9, wherein said trailing edge (62) of said vane (46) can be deflected in a first direction to generate said positive pre-whirl flow or in a second direction to generate said negative pre-whirl flow.

11. The apparatus of claim 1, wherein said channel (34) is generally perpendicular to the axis of said compressor (12-22) and said vane (46) is mounted along a wall of said channel (34) so that in its undeflected position, said vane (46) does not deflect air passing through said channel (34).

12. The apparatus of claim 11, wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34).

13. The apparatus of claim 12, wherein a divider wall is provided in said channel (34) upstream of said vane (46).

14. An apparatus for generating pre-whirl of supply air to an inlet (18) of a radial compressor (12-22) comprising:
   a housing (28) for said pre-whirl generating apparatus (26), said housing (28) being mounted adjacent to said inlet (18) of said compressor (12-22) and forming an intake channel (34) for supply air in communication with and leading to said inlet (18);
   a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and
   means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said means for deflecting said vane (46) is an annular ring (30) within said housing (28) arranged to rotate around said channel (34) in a plane perpendicular to the direction of said air passing through said channel (34), said ring (30) being in contact with said trailing edge (62) of said vane (46) to mechanically deflect said trailing edge (62) of said vane (46) either in a positive or negative pre-whirl direction in response to rotation of said ring (30) around said channel (34),
   wherein said ring (30) contacts said trailing edge (62) of said vane (46) at a contact area near the radially outer corner of said trailing edge (62) of said vane (46), said contact area being received in a generally axially oriented slot (66) in said ring (30), whereby upon rotation of said ring (30) in a first positive direction around said channel (34), said vane (46) is deflected to a position that deflects air flowing through said channel (34) into a positive pre-whirl flow at said inlet (18), and upon rotation of said ring (30) in a second negative direction around said channel (34), said vane (46) is deflected to a position that deflects air flowing through said channel (34) into a negative pre-whirl flow at said inlet (18), and wherein said contact area is a tab extending from the radially outer corner of said trailing edge (62) of said vane (46), and said tab includes means for contacting said slot (66) in a way that allows control of said trailing edge (62) of said vane (46) to effect deflection of said vane (46) while permitting twisting of said tab in said slot (66) to accommodate deflection of said vane (46).

15. The apparatus of claim 14, wherein said slot (66) has lateral walls for contacting said tabs.

16. The apparatus of claim 15, wherein said tab has at least one generally convex lateral bearing surface for contacting said wall.

17. The apparatus of claim 16, wherein said tab has two lateral bearing surfaces on opposite sides of said tab for contacting opposite lateral walls of said slot (66).

18. The apparatus of claim 17, wherein said lateral bearing surfaces are generally hemispherical.

19. The apparatus of claim 16, wherein said trailing edge (62) has a crimp and said crimp extends through said tab forming said generally convex lateral bearing surface.

20. An apparatus for generating pre-whirl of supply air to an inlet (18) of a radial compressor (12-22) comprising:

a housing (28) for said pre-whirl generating apparatus (26), said housing (28) being mounted adjacent to said inlet (18) of said compressor (12-22) and forming an intake channel (34) for supply air in communication with and leading to said inlet (18);

a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said ring (30) contacts said trailing edge (62) of said vane (46) at a contact area near the radially outer corner of said trailing edge (62) of said vane (46), said contact area being received in a generally axially oriented slot (66) in said ring (30), whereby upon rotation of said ring (30) in a first positive direction around said channel (34), said vane (46) is deflected to a position that deflects air flowing through said channel (34) into a positive pre-whirl flow at said inlet (18), and upon rotation of said ring (30) in a second negative direction around said channel (34), said vane (46) is deflected to a position that deflects air flowing through said channel (34) into a negative pre-whirl flow at said inlet (18), and wherein said means for deflecting said vane (46) includes a pinion gear cooperating with a rack gear on said ring (30) to rotate said ring (30) in either a first rotational direction or a second rotational direction.

21. An apparatus for generating pre-whirl of supply air to an inlet (18) of a radial compressor (12-22) comprising:

a housing (28) for said pre-whirl generating apparatus (26), said housing (28) being mounted adjacent to said inlet (18) of said compressor (12-22) and forming an intake channel (34) for supply air in communication with and leading to said inlet (18);

a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said leading edge (60) of said vane (46) is circumferentially fixed in said channel (34) and said trailing edge (62) is free to be deflected circumferentially in said channel (34), and wherein said channel (34) has a generally helical groove, wherein said leading edge (60) of said vane (46) is affixed to a vane carrier (32) that is restricted from rotation in said channel (34), but is free to move axially in said channel (34), and wherein said trailing edge (62) of said vane (46) has a tab extending radially outwardly, said tab being received in said groove, and said means for deflecting said vane (46) is operative to move said vane carrier (32) axially within said housing (28) to cause said tab to move axially within said groove, thereby causing circumferential deflection of said trailing edge (62) of said vane (46).

22. The apparatus of claim 21, wherein said vane carrier (32) includes a rack gear and said means for deflecting said vane (46) is a pinion gear mounted on said housing (28) for cooperation with said rack gear on said vane carrier (32) to move said vane carrier (32) axially in said housing (28).

23. The apparatus of claim 21, wherein said grooves have axial ends, said vanes (46) are aligned with normal flow through said channel (34) and do not deflect air passing through said channel (34) when said vane carrier (32) is in an axial position to place said tab in a position in said groove intermediate of the axial ends of said groove.

24. The apparatus of claim 21, wherein axial movement of said vane carrier (32) toward said inlet (18) causes deflection of said vane (46) in a first direction, and axial movement of said vane carrier (32) away from said inlet (18) causes deflection of said vane (46) in a second direction.

25. The apparatus of claim 24, wherein deflection in said first direction causes positive pre-whirl flow at said inlet (18), and deflection in said second direction causes negative pre-whirl flow at said inlet (18).

26. The apparatus of claim 25, wherein said intermediate position of said tab in said groove, in which said vanes (46) do not deflect air passing through said channel (34), is closer to the axial end of said groove away from inlet (18) than the end nearest said inlet (18).

27. The apparatus of claim 26, wherein said groove is arranged to provide a greater deflection of said trailing edge (62) of said vane (46) when said vane carrier (32) is moved toward said inlet (18) than when said vane carrier (32) is moved away from said inlet (18).

28. An apparatus for generating pre-whirl of supply air to an inlet (18) of a radial compressor (12-22) comprising:

a housing (28) for said pre-whirl generating apparatus (26), said housing (28) being mounted adjacent to said inlet (18) of said compressor (12-22) and forming an intake channel (34) for supply air in communication with and leading to said inlet (18);

a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said channel (34) is generally perpendicular to the axis of said compressor (12-22) and said vane (46) is mounted along a wall of said channel (34) so that in its undeflected position, said vane (46) does not deflect air passing through said channel (34), wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), and wherein said actuating arm is a C-shaped actuator (162) received in a C-shaped recess in said housing (28), and wherein said actuating arm is rotatable through said recess to extend into said channel (34) to deflect said vane (46) into said channel (34).

29. The apparatus of claim 28, wherein said C-shaped actuator (162), said C-shaped recess, and said inlet (18) are generally circular and are concentric.

30. The apparatus of claim 29, wherein, when said actuator is extended into said channel (34) to deflect said vane (46) into said channel (34), said vane (46) deflects air flowing through said channel (34) to generate a pre-whirl flow at said inlet (18), and said C-shaped actuator (162) forms a generally circular chamber (172) for said pre-whirl flow adjacent to said inlet (18).

31. An apparatus for generating pre-whirl of supply air to an inlet (18) of a radial compressor (12-22) comprising:

a housing (28) for said pre-whirl generating apparatus (26), said housing (28) being mounted adjacent to said inlet (18) of said compressor (12-22) and forming an intake channel (34) for supply air in communication with and leading to said inlet (18);

a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said channel (34) is generally perpendicular to the axis of said compressor (12-22) and said vane (46) is mounted along a wall of said channel (34) so that in its undeflected position, said vane (46) does not deflect air passing through said channel (34), wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), and including two vanes (46) on opposite sides of said channel (34), and further including means for deflecting said each vane (46), said means being operative to deflect a first vane to generate a pre-whirl flow in a first direction and to deflect a second vane to generate a pre-whirl flow in a second direction.

32. The apparatus of claim 31, wherein said actuating arm is a C-shaped actuator (162) received in a C-shaped recess in said housing (28) and is rotatable through said recess to extend into said channel (34) to deflect said vane (46) into said channel (34), wherein said apparatus includes two vanes on opposite sides of said channel (34), and said C-shaped actuator (162) is operative to deflect either vane into said channel (34).

33. The apparatus of claim 32, wherein said C-shaped actuator (162), said C-shaped recess, and said inlet (18) are generally circular and are concentric.

34. The apparatus of claim 33, wherein, when said actuator is extended into said channel (34) to deflect said vane (46) into said channel (34), said vane (46) deflects air flowing through said channel (34) to generate a pre-whirl flow at said inlet (18), and said C-shaped actuator (162) forms a generally circular chamber (172) for said pre-whirl flow adjacent to said inlet (18).

35. An apparatus for generating pre-whirl of supply air to an inlet (18) of a radial compressor (12-22) comprising:

a housing (28) for said pre-whirl generating apparatus (26), said housing (28) being mounted adjacent to said inlet (18) of said compressor (12-22) and forming an intake channel (34) for supply air in communication with and leading to said inlet (18);

a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22), wherein said channel (34) is generally perpendicular to the axis of said compressor (12-22) and said vane (46) is mounted along a wall of said channel (34) 80 that in its undeflected position, said vane (46) does not deflect air passing through said channel (34), wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), and wherein said actuating arm is an arcuate deflecting actuator attached to a swing arm mounted to swing about a pivot to extend said actuator into said channel (34) and deflect said vane (46) into said channel (34).

36. An apparatus for generating pre-whirl of supply air to an inlet (18) of a radial compressor (12-22) comprising:
a housing (28) for said pre-whirl generating apparatus (26), said housing (28) being mounted adjacent to said inlet (18) of said compressor (12-22) and forming an intake channel (34) for supply air in communication with and leading to said inlet (18);
a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and
means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22),
wherein said channel (34) is generally perpendicular to the axis of said compressor (12-22) and said vane (46) is mounted along a wall of said channel (34) 50 that in its undeflected position, said vane (46) does not deflect air passing through said channel (34),
wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), and
wherein said vane (46) is a flexible membrane and said actuating arm is a pivotable actuator having a contact point for contacting said membrane and arranged to pivot into said channel (34) in contact with said membrane thereby deflecting said membrane into said channel (34).

37. The apparatus of claim 36, wherein, when said pivotable actuator is pivoted into said channel (34), said contact point contacts said membrane at about its midpoint, and a portion of said membrane on one side of said contact point forms said vane (46), and the portion of said membrane on the other side of said contact point forms a pre-whirl chamber adjacent to said inlet (18).

38. An apparatus for generating pre-whirl of supply air to an inlet (18) of a radial compressor (12-22) comprising:
a housing (28) for said pre-whirl generating apparatus (26), said housing (28) being mounted adjacent to said inlet (18) of said compressor (12-22) and forming an intake channel (34) for supply air in communication with and leading to said inlet (18);
a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and
means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22),
wherein said channel (34) is generally perpendicular to the axis of said compressor (12-22) and said vane (46) is mounted along a wall of said channel (34) 50 that in its undeflected position, said vane (46) does not deflect air passing through said channel (34),
wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), and
wherein said trailing edge (62) of said vane (46) has an attachment means to which is attached said leading edge (60) of a lower plate, said actuating arm contacts said trailing edge (62) of said vane (46) adjacent to said attachment means, and said trailing edge (62) of said lower plate is arranged for sliding engagement with the wall of said channel (34), whereby when said actuating arm is moved into said channel (34) to deflect said vane (46) into said channel (34), said leading edge (60) of said lower plate follows said trailing edge (62) of said vane (46) into said channel (34), and said trailing edge (62) of said lower plate slides along said wall of said channel (34).

39. The apparatus of claim 38, wherein, when said leading edge (60) of said lower plate follows said trailing edge (62) of said vane (46) into said channel (34), and said trailing edge (62) of said lower plate slides along said wall of said channel (34), said lower plate forms a pre-whirl chamber adjacent to said inlet (18).

40. An apparatus for generating pre-whirl of supply air to an inlet (18) of a radial compressor (12-22) comprising:
a housing (28) for said pre-whirl generating apparatus (26), said housing (28) being mounted adjacent to said inlet (18) of said compressor (12-22) and forming an intake channel (34) for supply air in communication with and leading to said inlet (18);
a deformable air deflecting vane (46) positioned in said channel (34), said vane (46) having a leading edge (60) and a trailing edge (62), said leading edge (60) being fixed in said channel (34), and said trailing edge (62) being free to be deflected with respect to said channel (34) to deflect air passing through said channel (34); and
means for selectively deflecting said trailing edge (62) of said vane (46) so that said vane (46) will deflect air passing through said channel (34) to generate a pre-whirl flow in either a positive, neutral, or negative direction at said inlet (18) of said compressor (12-22),
wherein said channel (34) is generally perpendicular to the axis of said compressor (12-22) and said vane (46) is mounted along a wall of said channel (34) so that in its undeflected position, said vane (46) does not deflect air passing through said channel (34), and
wherein said inlet (18) is generally circular and said channel (34) is eccentric to the center of said inlet (18).

41. The apparatus of claim 40, wherein said vane (46) is attached to a wall of said channel (34) farthest from said center of said inlet (18), and when said vane (46) is in its undeflected position, it does not deflect air passing through said channel (34), and a pre-whirl flow is generated at said inlet (18).

42. The apparatus of claim 41, wherein the pre-whirl flow generated when said vane (46) is in its undeflected position is a negative pre-whirl flow.

43. The apparatus of claim 40, wherein said vane (46) is attached to a wall of said channel (34) farthest from said center of said inlet (18), and when said vane (46) is deflected to an intermediate position, said vane (46) creates an absence of pre-whirl flow at said inlet (18).

44. The apparatus of claim 40, wherein said vane (46) is attached to a wall of said channel (34) farthest from said center of said inlet (18), and when said vane (46) is fully deflected into said channel (34), said vane (46) creates a positive pre-whirl flow at said inlet (18).

45. The apparatus of claim 40, wherein said means for deflecting said vane (46) is an actuating arm positioned outside of said channel (34) adjacent to said trailing edge (62) of said vane (46) and extendable into said channel (34) to engage said trailing edge (62) of said vane (46) and to deflect said vane (46) into said channel (34), thereby positioning said vane (46) to deflect air passing through said channel (34), wherein said actuating arm is a C-shaped actuator (162) received in a C-shaped recess in said housing (28) and is rotatable through said recess to extend into said channel (34) to deflect said vane (46) into said channel (34).

46. The apparatus of claim 45, wherein said C-shaped actuator (162), said C-shaped recess, and said inlet (18) are generally circular and are concentric.

47. The apparatus of claim 46, wherein, when said actuator is extended into said channel (34) to deflect said vane (46) into said channel (34), said vane (46) deflects air flowing through said channel (34) to generate a pre-whirl flow at said inlet (18), and said C-shaped actuator (162) forms a generally circular chamber (172) for said pre-whirl flow adjacent to said inlet (18).

* * * * *